(12) United States Patent
Hill et al.

(10) Patent No.: US 11,054,058 B2
(45) Date of Patent: Jul. 6, 2021

(54) ACTIVELY COOLED VACUUM ISOLATION VALVE

(71) Applicant: MKS Instruments, Inc., Andover, MA (US)

(72) Inventors: Gordon Hill, Arlington, MA (US); David F. Broyer, Kingston, NH (US); David C. Neumeister, Longmont, CO (US); Bradly Raymond Lefevre, Lakewood, CO (US)

(73) Assignee: MKS Instruments, Inc., Andover, MA (US)

( * ) Notice: Subject to any disclaimer, the term of this patent is extended or adjusted under 35 U.S.C. 154(b) by 31 days.

(21) Appl. No.: 16/408,752

(22) Filed: May 10, 2019

(65) Prior Publication Data

US 2019/0271410 A1    Sep. 5, 2019

Related U.S. Application Data

(62) Division of application No. 15/478,623, filed on Apr. 4, 2017, now abandoned.
(Continued)

(51) Int. Cl.
*F16K 49/00* (2006.01)
*F16K 1/22* (2006.01)
(Continued)

(52) U.S. Cl.
CPC ............ *F16K 49/007* (2013.01); *F16K 1/126* (2013.01); *F16K 1/22* (2013.01); *F16K 1/222* (2013.01);
(Continued)

(58) Field of Classification Search
CPC .................. F16K 49/007; Y10T 137/6579
See application file for complete search history.

(56) References Cited

U.S. PATENT DOCUMENTS

| | | | |
|---|---|---|---|
| 2,446,196 A | | 8/1948 | Sitney |
| 3,776,260 A | * | 12/1973 | Ruddick ............. B67D 1/0832 137/321 |

(Continued)

FOREIGN PATENT DOCUMENTS

| | | |
|---|---|---|
| DE | 2609027 A1 | 9/1977 |
| DE | 19527285 A1 | 1/1997 |

(Continued)

OTHER PUBLICATIONS

Machine translation JPS59132969U.*
(Continued)

*Primary Examiner* — Kevin F Murphy
(74) *Attorney, Agent, or Firm* — Burns & Levinson, LLP; Joseph M. Maraia; Steven M. Mills

(57) ABSTRACT

A cooled isolation valve includes a valve body, a stationary element coupled to the valve body, and a movable closure element movable with respect to the stationary element between a closed position in which the movable closure element and the stationary element are brought together and an open position. One of the movable closure element and the stationary element includes a sealing element. In the closed position of the movable closure element, the sealing element provides a seal between the movable closure element and the stationary element. A fluid channel is formed in contact with the movable closure element and movable with the movable closure element with respect to the stationary element, such that a fluid in the fluid channel effects heat transfer in the movable closure element. A bellows of the isolation valve can include a metallic substrate with a ceramic coating.

35 Claims, 28 Drawing Sheets

Related U.S. Application Data

(60) Provisional application No. 62/320,718, filed on Apr. 11, 2016.

(51) Int. Cl.

| | | |
|---|---|---|
| *F16K 1/46* | (2006.01) | |
| *F16K 1/12* | (2006.01) | |
| *F16K 3/06* | (2006.01) | |
| *F16K 31/122* | (2006.01) | |
| *F16K 41/10* | (2006.01) | |
| *F16K 51/02* | (2006.01) | |

(52) U.S. Cl.
CPC ............... *F16K 1/46* (2013.01); *F16K 3/06* (2013.01); *F16K 31/1221* (2013.01); *F16K 41/10* (2013.01); *F16K 51/02* (2013.01); *Y10T 137/6579* (2015.04)

(56) References Cited

U.S. PATENT DOCUMENTS

| | | | |
|---|---|---|---|
| 4,715,400 A | | 12/1987 | Gardner et al. |
| 5,401,001 A | ‡ | 3/1995 | Cook .................... F01N 3/2053 251/308 |
| 5,667,224 A | ‡ | 9/1997 | Streckert ................ F16J 15/52 220/62.11 |
| 8,196,893 B2 | ‡ | 6/2012 | Grout ...................... F16K 1/36 137/375 |
| 8,230,879 B2 | * | 7/2012 | Kleegrewe ............ G05G 23/02 137/554 |
| 8,434,511 B2 | * | 5/2013 | Williams .................. F16K 3/10 137/340 |
| 8,671,987 B2 | ‡ | 3/2014 | Gu ........................... F16K 1/52 137/630 |
| 9,157,533 B2 | ‡ | 10/2015 | Sin ........................ F16K 1/2014 |
| 9,328,847 B2 | ‡ | 5/2016 | Schiestl ................ F16K 49/005 |
| 2002/0050581 A1 | ‡ | 5/2002 | Ettinger .................. F16K 3/188 251/16 |
| 2002/0134441 A1 | * | 9/2002 | Kusumoto ................ F16K 1/36 137/625.3 |
| 2003/0015495 A1 | ‡ | 1/2003 | Genzer .................... B05D 5/00 216/63 |
| 2008/0078453 A1 | ‡ | 4/2008 | Sander .................. F16K 25/005 137/37 |
| 2011/0006236 A1 | | 1/2011 | Williams et al. |
| 2012/0153193 A1 | | 6/2012 | Gu et al. |
| 2013/0199615 A1 | * | 8/2013 | McHugh ............ G05D 23/1917 137/1 |
| 2013/0199628 A1 | * | 8/2013 | Schiestl ................ F16K 49/005 137/340 |
| 2013/0221621 A1 | ‡ | 8/2013 | Araujo ................ C23C 14/0641 277/444 |
| 2014/0109973 A1 | ‡ | 4/2014 | Neumeister ............. F16K 41/10 137/1 |
| 2014/0217679 A1 | ‡ | 8/2014 | Barrall .................. C23C 24/082 277/592 |
| 2014/0328146 A1 | ‡ | 11/2014 | Vouillamoz ............. F04B 53/14 368/65 |
| 2015/0170955 A1 | ‡ | 6/2015 | Ouye ................. H01L 21/68785 438/46 |
| 2015/0285382 A1 | | 10/2015 | Kienreich et al. |
| 2017/0152968 A1 | ‡ | 6/2017 | Raj ..................... C23C 16/4404 |

FOREIGN PATENT DOCUMENTS

| | | |
|---|---|---|
| DE | 10024055 A1 | 11/2001 |
| GB | 843317 A | 8/1960 |
| GB | 976291 | 11/1964 |
| JP | S59132969 U | 9/1984 |
| JP | 4504454 A | 8/1992 |
| JP | 791555 | 4/1995 |
| JP | 07091555 | 4/1995 |
| JP | 2000291826 A | 10/2000 |
| JP | 2001182843 A | 7/2001 |
| JP | 2007327612 A | 12/2007 |
| JP | 2008232167 A | 10/2008 |
| JP | 4923105 | 4/2012 |
| JP | 2015059616 | 3/2015 |
| KR | 1020070079449 | 8/2007 |
| KR | 1020150142105 | 12/2015 |

OTHER PUBLICATIONS

International Search Report and Written Opinion from corresponding PCT Application No. PCT/US2017/026807, International Filing Date Apr. 10, 2017, dated Aug. 18, 2017.‡

The Notice of Preliminary Rejection from Korean Patent Application No. 10-2018-7028364 dated Feb. 19, 2020.

Office Action issued in Japanese Application No. 2018-548760 dated Jun. 2, 2020.

Extended European Search Report Issued in EP17782918.1 dated Oct. 24, 2019.

Office Action issued in Japanese Application No. 2018-548760 dated Nov. 5, 2019.

\* cited by examiner
‡ imported from a related application

ACTIVELY COOLED VACUUM ISOLATION VALVE

CROSS-REFERENCE TO RELATED APPLICATIONS

This application is a divisional application of co-pending U.S. application Ser. No. 15/478,623, filed Apr. 4, 2017, entitled "ACTIVELY COOLED VACUUM ISOLATION VALVE", which in turn claims priority to and the benefit of U.S. Provisional Patent Application No. 62/320,718, filed on Apr. 11, 2016 and titled "ACTIVELY COOLED VACUUM ISOLATION VALVE", the contents of which are incorporated herein by reference as though fully set forth herein.

BACKGROUND

Technical Field

The present disclosure is related to vacuum isolation valves and, in particular, to vacuum isolation valves with active cooling.

Discussion of Related Art

Bellows-sealed, poppet vacuum isolation valves are commonly used in semiconductor processing systems. The valves are commonly heated to a specific temperature from the outside in order to prevent byproducts from the chemical vapor deposition (CVD) process being performed from condensing in the valves.

A challenging application for an isolation valve is isolating a flow of reactive gas. Atomic fluorine, for example, is commonly used for chamber cleaning, and is introduced from a remote plasma source. In certain applications, it is useful to place an isolation valve between the remote plasma source and the chamber. It is important that the valve not reduce the atomic fluorine concentration, have high conductance, and be reliable in the application.

There are multiple challenges to the valve in this application. First, the atomic fluorine is extremely reactive, so materials that come in contact with the processing must be carefully selected. Second, the gas temperature inside the remote plasma source, e.g., ASTRON remote plasma source sold by MKS Instruments, Inc., is on the order of 3000K, although at typical pressures of approximately 10 Torr, the heat transported by the gas is moderate.

A significant problem is that when the atomic fluorine collides with a surface, it has an increased probability of recombining into molecular F2. The recombination of atomic fluorine into molecular fluorine is an exothermic reaction that can generate significant heat on the internal components of a vacuum valve. Similarly, oxygen or hydrogen radicals that are produced will have a tendency to recombine and generate heat when colliding with surfaces inside the valve. For example, with 1 slm of NF3 entering the remote plasma source, the heat load on surfaces downstream of the remote plasma source is on the order of 50 mW/cm^2.

Although the total heat input may be relatively small (on the order of 500 mW-5 W), there is typically high thermal resistance between the moving components of a valve and a cold sink, and therefore the moving components can reach excessive temperatures. The moving part of the valve that forms the seal, commonly the nosepiece, has a very poor conduction path to air at atmosphere where natural convection can occur. The stem and bellows are typically a welded assembly fabricated from stainless steel, which has poor thermal conductivity. In the vacuum space, the pressures are typically on the order of 1-10 Torr, where convection and conduction effects are negligible. Even when the valve is closed, the designs are careful to avoid metal to metal contact between the nosepiece and seat. So, with a moderate power input to the valve internals of several watts, internal temperatures can get extremely high. At temperatures above 250° C., most elastomer or perfluoroelastomer seals will have exceeded their temperature rating. At temperatures above 300° C., most aluminum alloys have lost substantial mechanical strength.

SUMMARY

According to a first aspect, a cooled isolation valve is provided. The valve includes a valve body, a stationary element coupled to the valve body and stationary with respect to the valve body, and a movable closure element being movable with respect to the stationary element between a closed position in which the movable closure element and the stationary element are brought together and an open position. One of the movable closure element and the stationary element comprises a sealing element. In the closed position of the movable closure element, the sealing element provides a seal between the movable closure element and the stationary element. A fluid channel is formed in contact with the movable closure element and is movable with the movable closure element with respect to the stationary element, such that a fluid in the fluid channel effects heat transfer in the movable closure element.

In some exemplary embodiments, the cooled isolation valve further comprises a sensor for detecting whether the movable closure element is in the open position or the closed position and an actuator for inhibiting flow of the fluid when the sensor detects that the movable closure element is in the closed position.

In some exemplary embodiments, the cooled isolation valve further comprises a pneumatic actuation device for controlling movement of the movable closure element and a bellows for isolating the pneumatic actuation device from an environment within the valve body. In these embodiments, the bellows are disposed adjacent to the pneumatic actuation device radially from a longitudinal axis of the valve and at least partially overlapping the pneumatic actuation device along the longitudinal axis.

In some exemplary embodiments, the sealing element comprises an O-ring. In some exemplary embodiments, the valve further comprises a groove in one of the stationary element and the movable closure element, the O-ring being disposed in the groove and a surface of the O-ring protruding from the groove. A protrusion in a surface of the other of the stationary element and the movable closure element contacts a portion of the protruding surface of the O-ring when the movable closure element is in the closed position, such that the O-ring is free to expand and contract.

In some exemplary embodiments, the sealing element comprises an O-ring. In some exemplary embodiments, the valve further comprises a groove in one of the stationary element and the movable closure element, the O-ring being disposed in the groove and a surface of the O-ring protruding from the groove. A concave feature in a surface of the other of the stationary element and the movable closure element contacts a portion of the protruding surface of the O-ring when the movable closure element is in the closed position, such that the O-ring is free to expand and contract.

In some exemplary embodiments, the valve is a poppet valve. In these embodiments, the movable closure element can comprise a nosepiece of the poppet valve. The stationary element can comprise a valve seat of the poppet valve. At least a portion of the cooling channel can be formed in the nosepiece. The nosepiece can be coupled to a movable stem of the cooled isolation valve. At least a portion of the cooling channel can be formed in the stem. The sealing element can comprise an O-ring in a groove, the groove being formed in a nosepiece of the poppet valve.

In some exemplary embodiments, the valve is a gate valve. In these embodiments, the movable closure element can comprise a gate movable between the closed position and the open position and a shaft fixedly attached to the gate, rotation of the shaft causing movement of the gate between the open and closed positions. The stationary element can comprise a valve seat. At least a portion of the cooling channel can be formed in the gate. At least a portion of the cooling channel can be formed in the shaft. The sealing element can comprise an O-ring in a groove, the groove being formed in the gate.

In some exemplary embodiments, the valve is a butterfly valve. In these embodiments, the movable closure element can comprise a flapper movable between the closed position and the open position and a shaft fixedly attached to the flapper, rotation of the shaft causing movement of the flapper between the open and closed positions. The stationary element can comprises walls of an opening through the valve. At least a portion of the cooling channel can be formed in the flapper. At least a portion of the cooling channel can be formed in the shaft.

In some exemplary embodiments, the fluid can comprise a gas or a liquid. For example, the fluid can comprise air, nitrogen (N2), water, a heat transfer fluid, or some combination of these fluids.

According to another aspect, a method of forming a bellows for an isolation valve is provided. According to the method, a metallic bellows substrate is provided. The metallic bellows substrate is configured to one of a compressed state and an elongated state. While maintained in that state, a first layer of a ceramic coating is applied to the metallic bellows substrate. The metallic bellows substrate is transitioned to the other of the compressed state and the elongated state. While maintained in that state, a second layer of the ceramic coating is applied.

In some exemplary embodiments, the metallic bellows substrate is formed of stainless steel.

In some exemplary embodiments, the ceramic coating comprises aluminum oxide.

In some exemplary embodiments, a ratio of thickness of the metallic bellows substrate to thickness of the ceramic coating is greater than 100:1.

According to another aspect, a bellows for a vacuum isolation valve is provided. The bellows includes a metallic substrate and a coating of ceramic material formed over the metallic substrate.

In some exemplary embodiments, the metallic bellows substrate is formed of stainless steel.

In some exemplary embodiments, the ceramic coating comprises aluminum oxide.

In some exemplary embodiments, a ratio of thickness of the metallic bellows substrate to thickness of the ceramic coating is greater than 100:1.

BRIEF DESCRIPTION OF THE DRAWINGS

The present disclosure is further described in the detailed description which follows, in reference to the noted plurality of drawings by way of non-limiting examples of embodiments of the present disclosure, in which like reference numerals represent similar parts throughout the several views of the drawings.

DETAILED DESCRIPTION OF PREFERRED EMBODIMENTS

Figure 1:
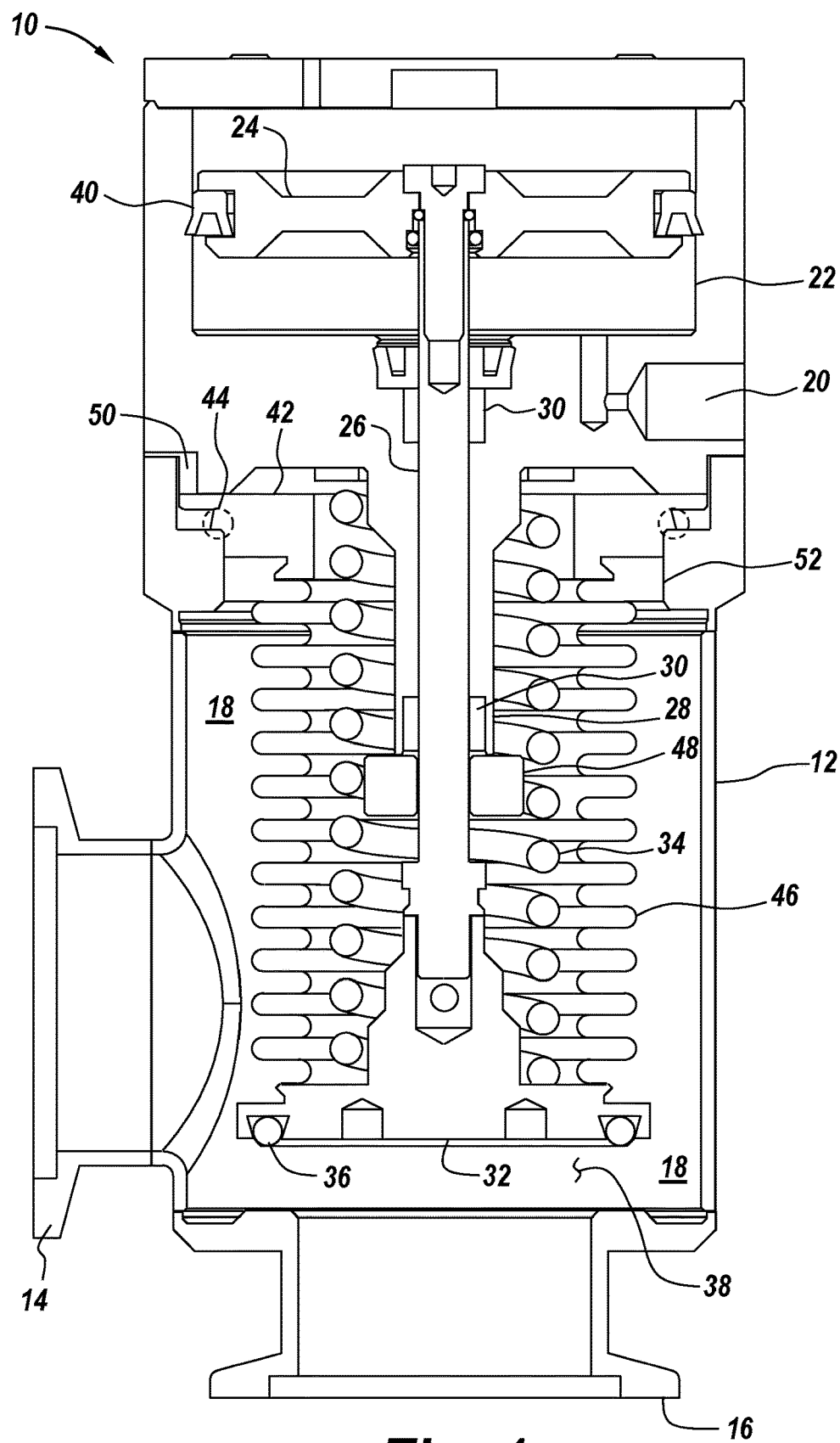
FIG. 1 includes a schematic cross-sectional view of a conventional bellows-sealed poppet isolation valve.

FIG. 1 includes a schematic cross-sectional view of a conventional bellows-sealed poppet isolation valve 10. Referring to FIG. 1, valve 10 includes valve body 12 which encloses at least the internal low-pressure chamber 18 of valve 10. Valve flanges 14 and 16 are used to fixedly connect valve 10 between, for example, a processing chamber (not shown) and a source of reactive gases, such as a plasma generation system (not shown).

In the closed state of valve 10 illustrated in FIG. 1, nosepiece 32 is sealed via nosepiece vacuum seal 36 to valve seat 38, under the bias force of spring 34. In this normally closed state, valve 10 isolates valve inlet and outlet at flanges 14 and 16, for example, to isolate the processing chamber from the source of reactive gases.

Valve 10 is typically controlled pneumatically via a pneumatic air inlet 20. High-pressure air introduced at air inlet 20 causes actuator 22 to move pneumatic piston 24 upwardly, carrying the fixedly attached stem 26 in the upward direction, sliding within stem guide 28 and stem bushings 30. Pneumatic seals 40 seal the pneumatic chamber to maintain elevated air pressure needed to actuate pneumatic piston 24. Nosepiece 32 is fixedly attached to the end of stem 26 and is forced upwardly against the bias force of spring 34 away from seat 38 to open valve 10, such that valve inlet and outlet communicate across internal chamber 18. This allows, for example, reactive gases to flow from the reactive gas source to the processing chamber. A spring bushing 48 can be used as a stroke stop by interfering with the travel of nosepiece 32.

Internal chamber 18 is sealed at the top by bonnet plate 42 and bonnet seal 44 between bonnet plate 42 and the interior wall of valve body 12. Internal valve components such as stem 26 and nosepiece 32 are isolated from internal chamber 18 by bellows 46. The interior of bellows 46 is vented to atmosphere via bellows vent 50. Bellows 46 is fixedly mounted to the interior wall of valve body 12 at bellows flange 52.

Figure 2:
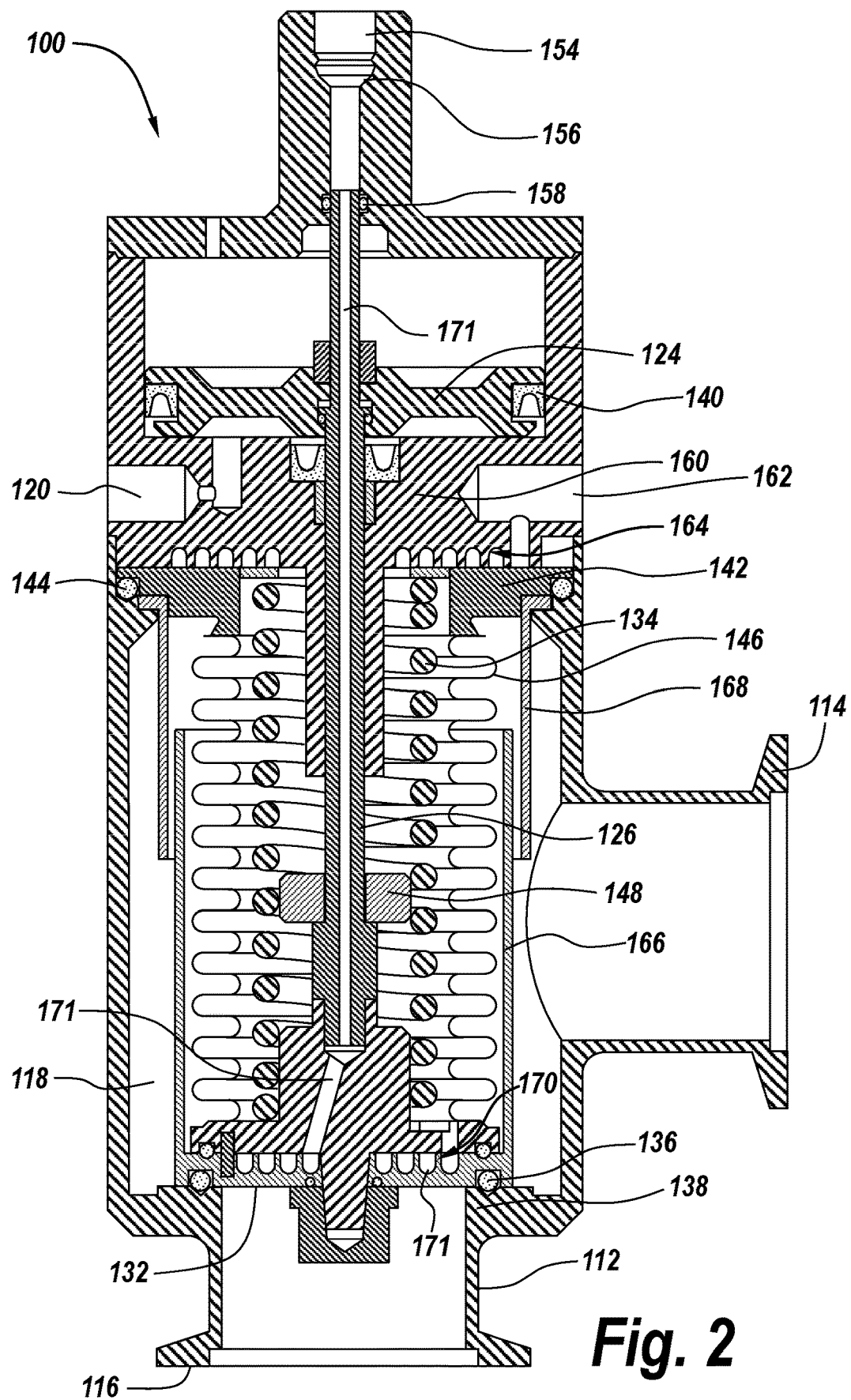
FIG. 2 includes a schematic cross-sectional diagram of a bellows-sealed poppet isolation valve of the type illustrated in FIG. 1, with active cooling, according to some exemplary embodiments.

FIG. 2 includes a schematic cross-sectional diagram of a bellows-sealed poppet isolation valve 100 of the type illustrated in FIG. 1, with active cooling, according to exemplary embodiments. In exemplary embodiments of valve 100 illustrated in FIG. 2, active cooling of the nosepiece and bonnet flange or plate are used to remove heat from the valve internal components. For example, in some particular exemplary embodiments, with forced air cooling, 4 watts of heat can be removed by 10 slm of air, causing the air temperature to decrease by 20° C.

Referring to FIG. 2, valve 100 includes valve body 112 which encloses at least the internal low-pressure chamber 118 of valve 100. Valve flanges 114 and 116 are used to fixedly connect valve 100 between, for example, a processing chamber (not shown) and a source of reactive gases, such as a plasma generation system (not shown).

In the closed state of valve 100 illustrated in FIG. 2, nosepiece 132 is sealed via nosepiece vacuum seal or nosepiece O-ring 136 to valve seat 138, under the bias force of spring 134. In this normally closed state, valve 100 isolates valve inlet and outlet at flanges 114 and 116, for example, to isolate the processing chamber from the source of reactive gases.

Valve 100 can be controlled pneumatically via a pneumatic air inlet 120. High-pressure air introduced at air inlet 120 causes pneumatic piston 124 to move upwardly, carrying the fixedly attached stem 126 in the upward direction. Pneumatic seals 140 seal the pneumatic chamber to maintain elevated air pressure needed to actuate pneumatic piston 124. Nosepiece 132 is fixedly attached to the end of stem 126 and is forced upwardly against the bias force of spring 134 away from seat 138 to open valve 100, such that valve inlet and outlet communicate across internal chamber 118. This allows, for example, reactive gases to flow from the reactive gas source to the processing chamber. A spring bushing 148 can be used as a stroke stop by interfering with the travel of nosepiece 132.

Internal chamber 118 is sealed at the top by bonnet plate or flange 142 and bonnet seal 144 between bonnet plate or flange 142 and the interior wall of valve body 112. Internal valve components such as stem 126 and nosepiece 132 are isolated from internal chamber 118 by bellows 146.

Figure 3A:
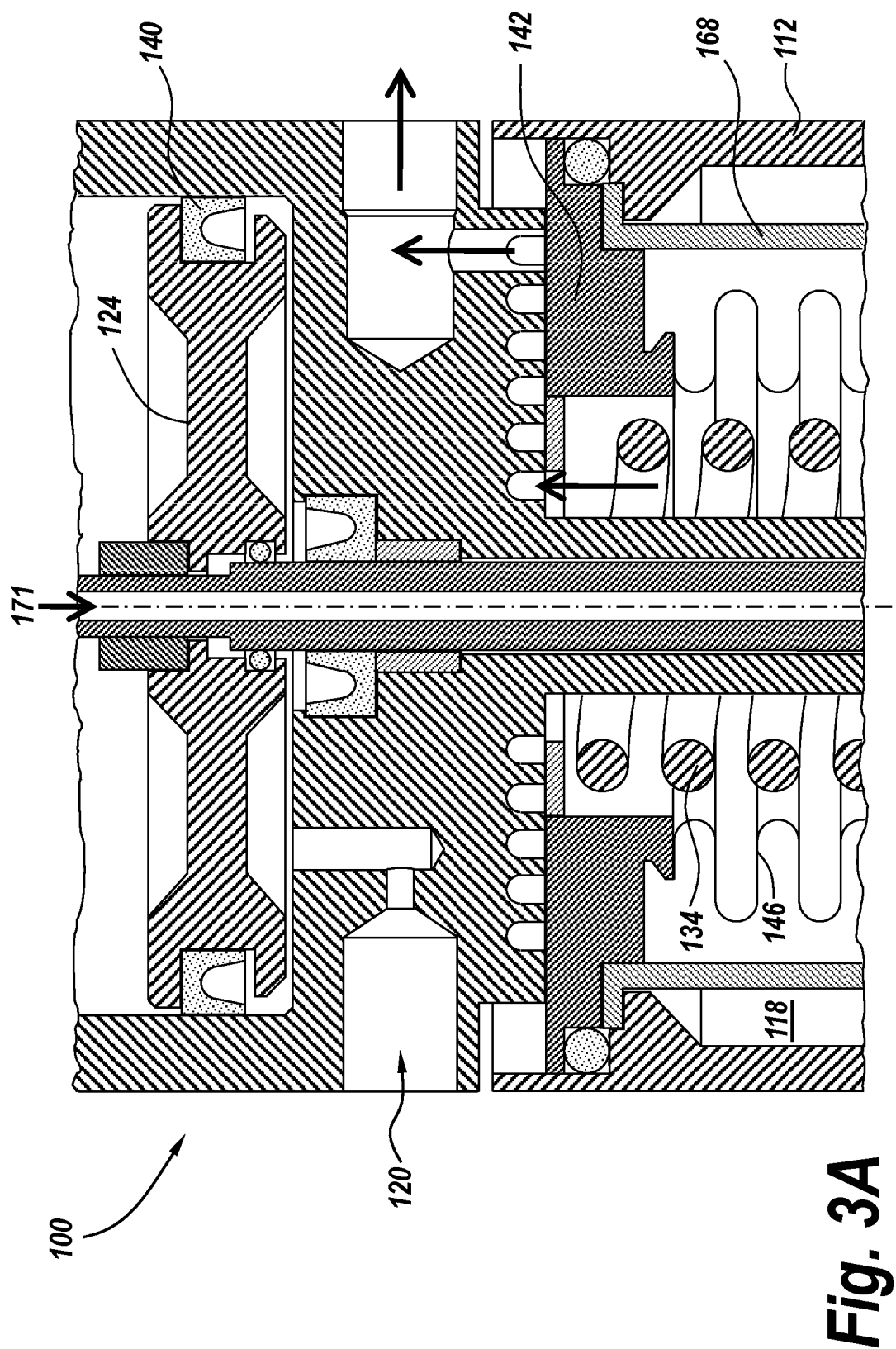
FIG. 3A includes a detailed partial cross-sectional view illustrating a portion of the valve of FIG. 2, according to some exemplary embodiments.
Figure 3B:
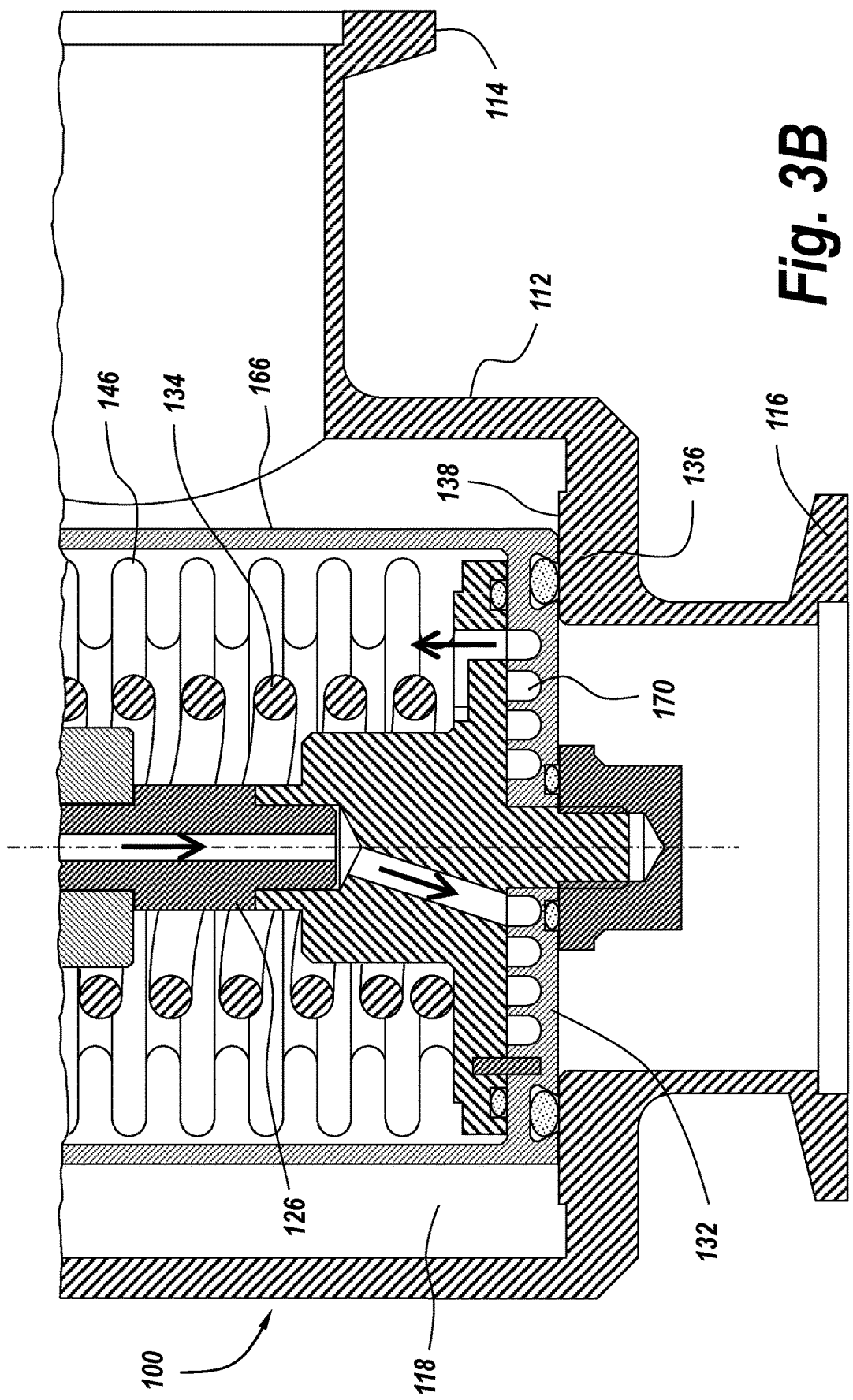
FIG. 3B includes a detailed partial cross-sectional view illustrating a portion of the valve of FIG. 2, according to some exemplary embodiments.
Figure 3C:
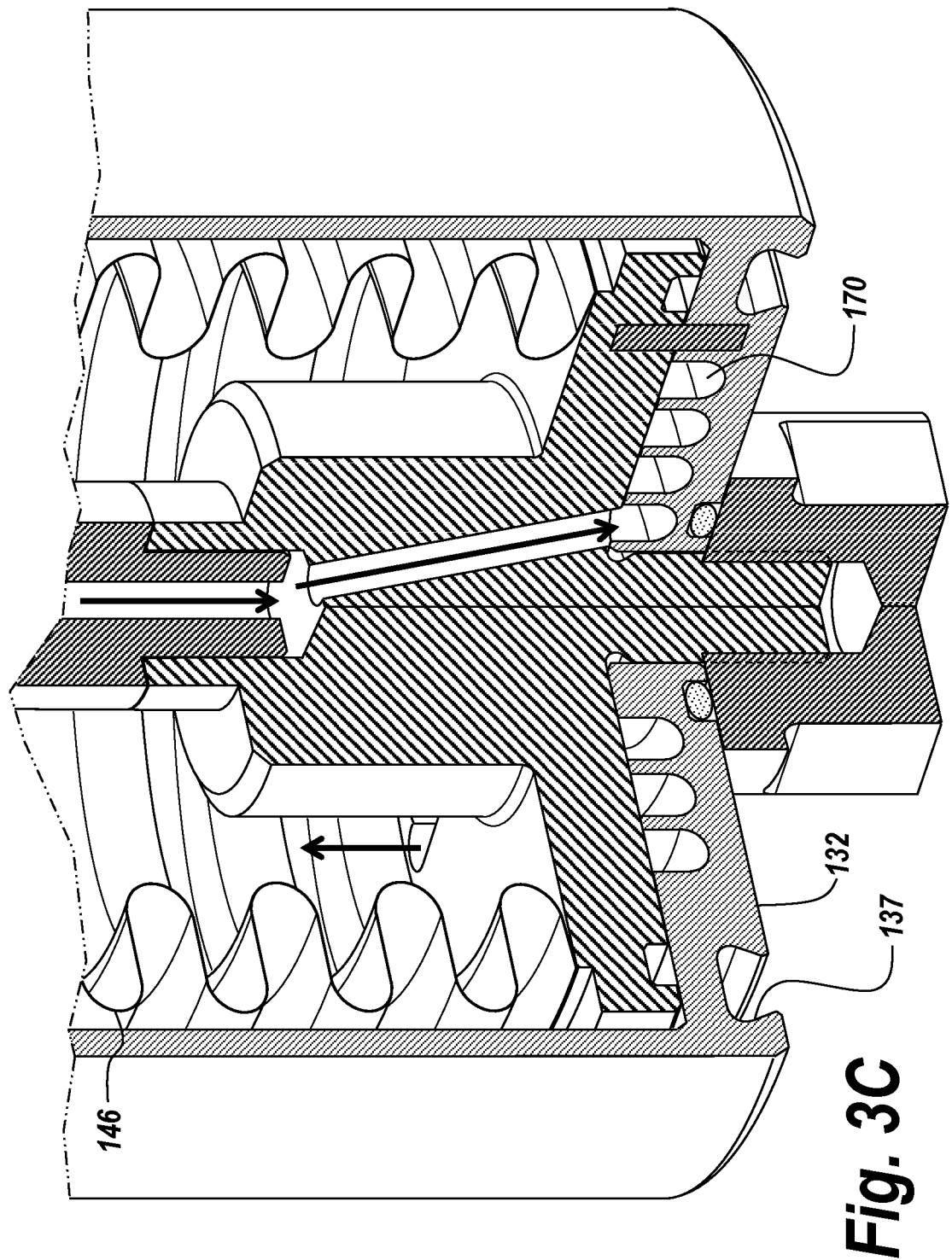
FIG. 3C includes a detailed partial cut-away view illustrating another portion of the valve of FIG. 2, according to some exemplary embodiments.
Figure 3D:
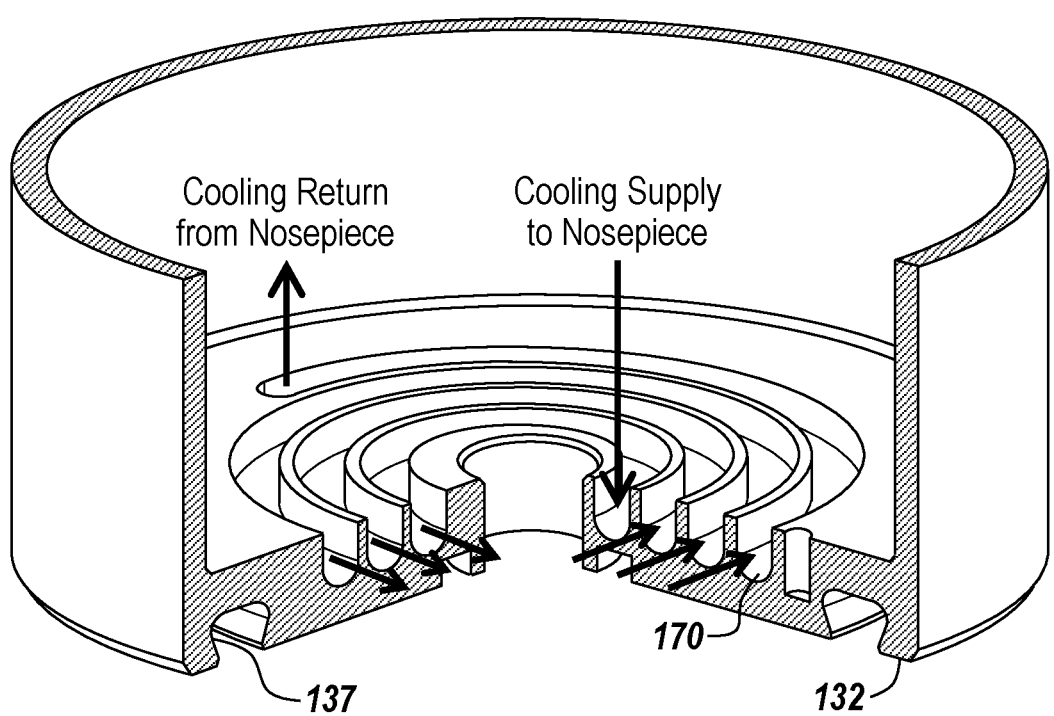
FIG. 3D includes a detailed partial cut-away view illustrating another portion of the valve of FIG. 2, according to some exemplary embodiments.

FIG. 3A includes a detailed partial cross-sectional view illustrating a portion of valve 100 of FIG. 2, according to some exemplary embodiments. FIG. 3B includes a detailed partial cross-sectional view illustrating a portion of valve 100 of FIG. 2, according to some exemplary embodiments. FIG. 3C includes a detailed partial cut-away view illustrating another portion of valve 100 of FIG. 2, according to some exemplary embodiments. FIG. 3D includes a detailed partial cut-away view illustrating another portion of valve 100 of FIG. 2, according to some exemplary embodiments. Specifically, FIG. 3A includes a detailed view of a cooling channel and cooling flow path in the area of bonnet flange or plate 142, in which the cooling flow path is indicated by arrows. FIG. 3B includes a detailed view of the cooling channel and flow path in the area of nosepiece 132, in which the cooling flow path is indicated by arrows. FIG. 3C includes a more detailed view of the cooling channel in the area of nosepiece 132, with selected components removed for clarity, in which the cooling flow path is indicated by arrows. FIG. 3D includes a more detailed view of the cooling channel in the area of nosepiece 132, with selected components removed for clarity, in which the cooling flow path is indicated by arrows.

Referring to FIGS. 2 and 3A-3D, actively cooled valve 100 includes an active cooling channel integrated into the structure. The cooling fluid, e.g., air, nitrogen (N2), water, or other such fluid, enters cooling channel 171 of valve 100 at cooling inlet 154 at an elevated pressure (60-80 psig), and passes through a flow limiting orifice 156, such that the fluid pressure downstream of orifice 156 is close to atmospheric pressure. Then the fluid travels through dynamic sliding seal 158, down an axial hole in stem 126, and reaches nosepiece 132. The fluid travels radially outward through a spiral groove or channel 170 formed in nosepiece 132. The spiral groove or channel is configured to optimize surface area and heat transfer. The fluid then exits spiral groove or channel 170 and enters the volume inside bellows 146 and travels upwards. The fluid then enters a second spiral groove or channel 164 formed between bonnet plate or flange 142 and upper block 160. The fluid then flows radially outward through the second spiral groove or channel 164, removing heat from bonnet plate or flange 142, and then exits valve 100 through cooling outlet 162. The fluid can then be ducted to a facility exhaust system to avoid generating turbulence that is undesirable in a clean room environment. In the case of a liquid cooling fluid, the fluid can be collected and disposed of, or it may be recycled through the valve, either with or without temperature control of the fluid.

Exposure of bellows 146 to process gas can be harmful to bellows 146 and, as a result, to valve 100. In the embodiments illustrated in FIGS. 2 and 3A-3D, bellows 146 is protected from exposure to the process gas. To that end, valve 100 includes nosepiece shield 166 and overlapping fixed shield 168 attached to bonnet flange or plate 142 disposed over bellows 146. The reactive process gas typically includes a high percentage of atomic fluorine, oxygen, or hydrogen radicals. These atomic species are more likely to recombine when adsorbed on a surface due to three-body recombination. By increasing the number of molecular wall collisions between the reactive gas and shields 166 and 168, the reactive gas is more likely to convert to molecular, less reactive molecules, before reaching bellows 146. This reduces the exposure of bellows 146 to the atomic reactive gas species, and therefore reduces the heat load on bellows 146 due to recombination. Bellows 146, being very thin and having poor thermal conductivity, have limited ability to dissipate heat that may be generated on the surface of bellows 146. However, shields 166 and 168 are thicker, have lower thermal resistance, and are fixed to structures that are well cooled.

Figure 4A:
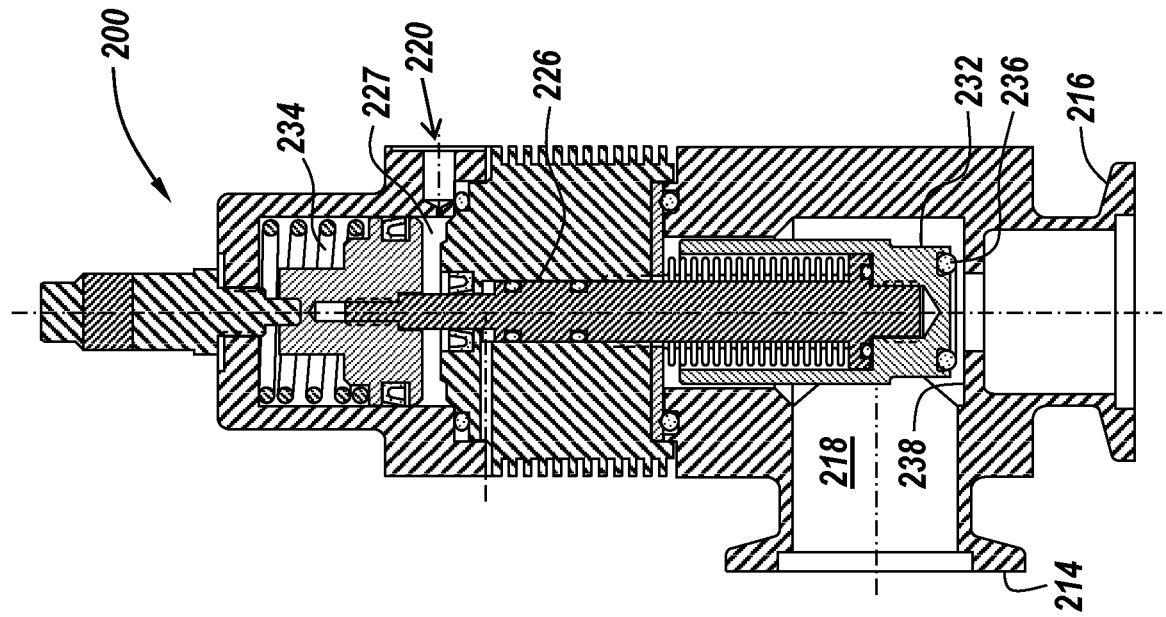
FIG. 4A includes two schematic cross-sectional views, rotated 90 degrees about the longitudinal axis with respect to each other, of a poppet isolation valve with active cooling, according to some exemplary embodiments.
Figure 4A:
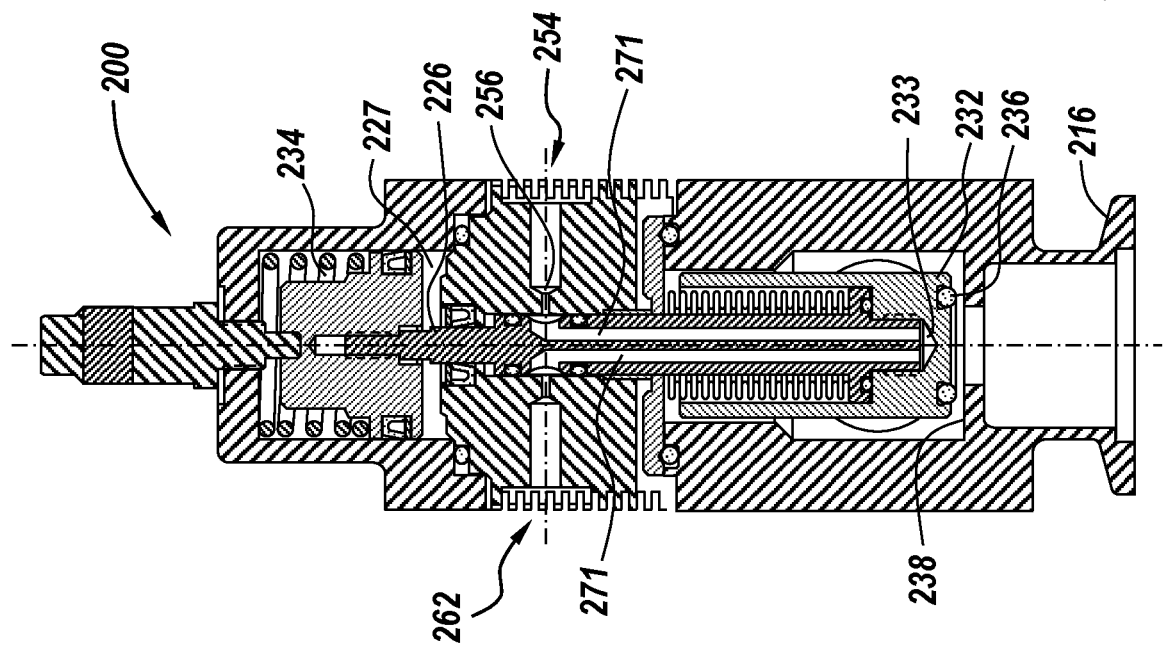
Figure 4B:
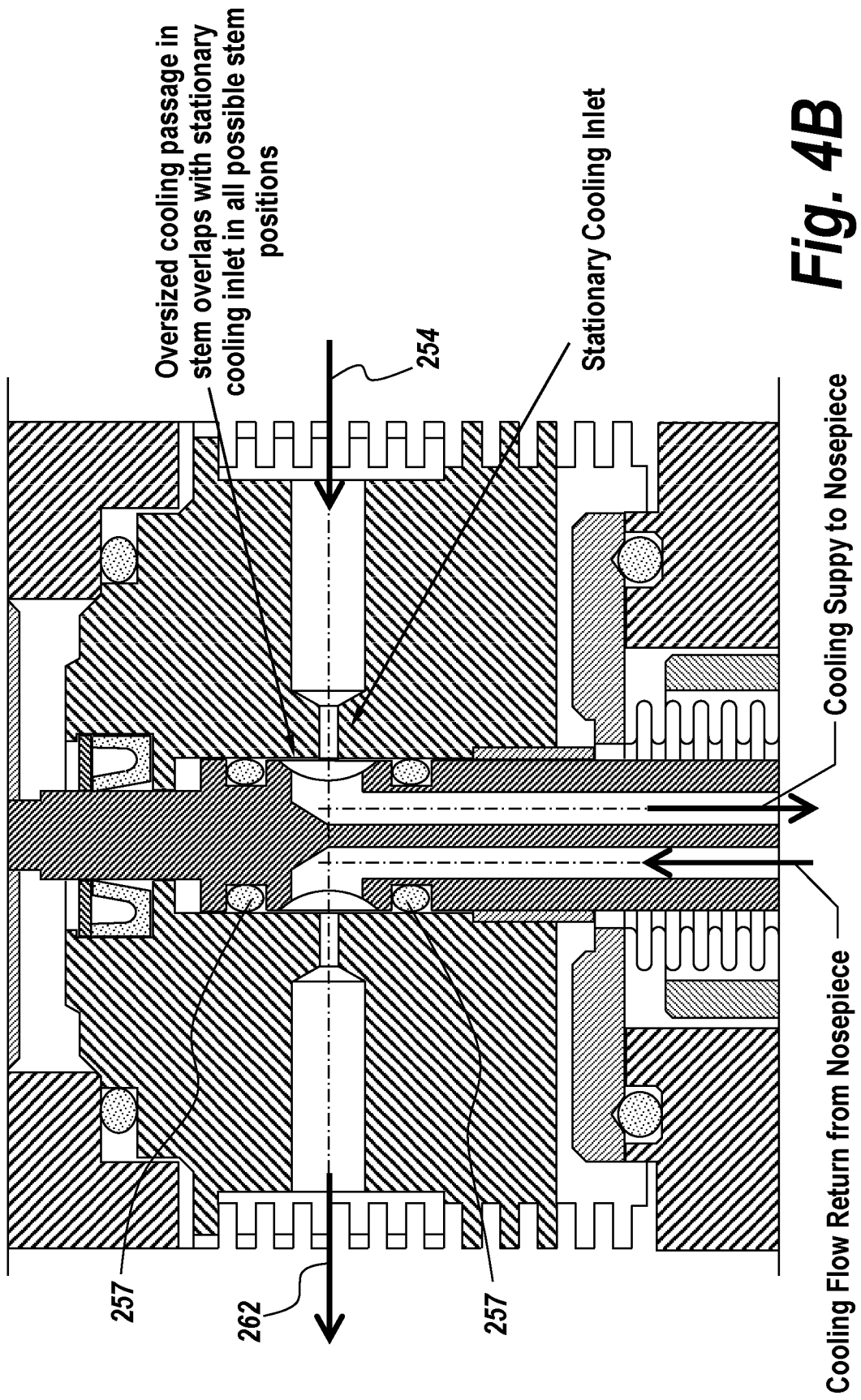
FIG. 4B includes a schematic cross-sectional view of a portion of the poppet isolation valve illustrated in FIG. 4A, according to some exemplary embodiments.

FIG. 4A includes two schematic cross-sectional views, rotated 90 degrees about the longitudinal axis with respect to each other, of a poppet isolation valve with active cooling, according to some exemplary embodiments. FIG. 4B includes a schematic cross-sectional view of a portion of the poppet isolation valve illustrated in FIG. 4A, according to some exemplary embodiments. Referring to FIGS. 4A and 4B, in actively cooled isolation valve 200, the cooling fluid enters valve 200 via fixed fitting 256, passes through a flow limiting orifice, then enters valve stem 226 by flowing between dynamic sliding seals 257. The cooling fluid then flows down stem 226 in supply and return cooling channel 271 to nosepiece 232, enters cavity 233, and then returns back up stem 226 through a second passage of supply and return cooling channel 271 in stem 226. The fluid then passes between the same dynamic sliding seals 257, and on to outlet fitting 262. In this embodiment, the cooling fluid could be air, nitrogen (N2), or for higher power applications, water. The cooling fluid could be a gas or liquid.

Similar to embodiments described above, valve 200 can be controlled pneumatically via pressurized air entering pneumatic chamber 227 via air inlet 220. In this case, when pneumatic chamber 227 is pressurized, stem 226 is forced upwardly against spring 234 to open valve 200 by moving nosepiece 232 and nosepiece seals 236 out of their seal with valve seat 238. When open, devices such as a processing chamber and a source of reactive gas can communication with each other via connections at flanges 214 and 216 across interior chamber 218. With reference to FIG. 4B in particular, in this embodiment, an oversized cooling passage in stem 226 overlaps with cooling inlet 256 in all positions of stem 226, thus allowing access of cooling inlet 256 to supply and return cooling channel 271 in all positions of stem 226. The same is true of the oversized cooling passage connected to cooling outlet 262. Also, dynamic seals 257 contain the oversized cooling passages in stem 226 in all possible positions of stem 226.

Figure 5:
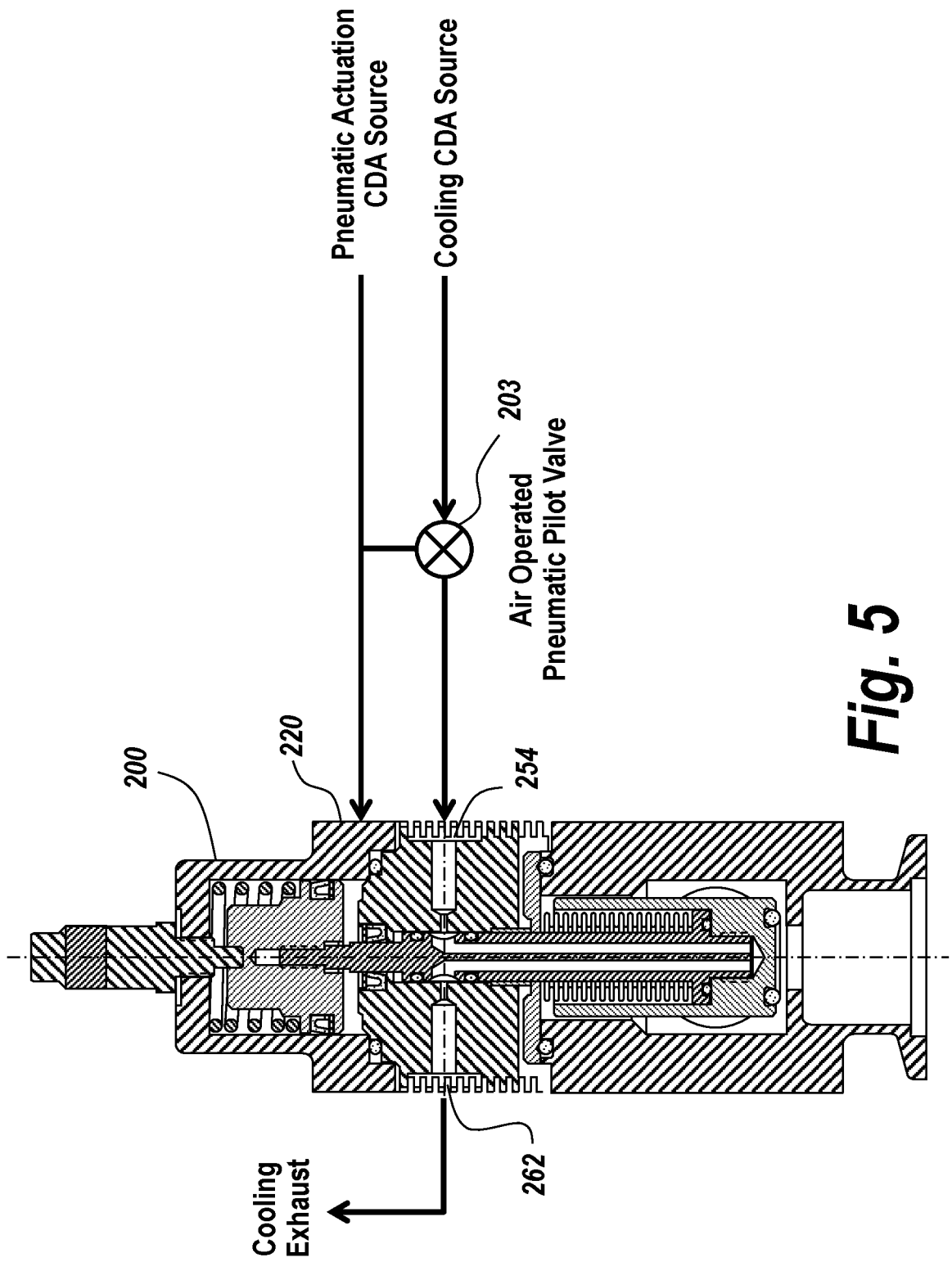
FIG. 5 includes a schematic functional diagram of a system utilizing the valve of FIGS. 4A and 4B, according to some exemplary embodiments.

FIG. 5 includes a schematic functional diagram of a system utilizing valve 200 of FIGS. 4A and 4B, according to some exemplary embodiments. It may be desirable to limit the cooling when there is no heat load from reactive gas. In this case, the cooling fluid can be switched off by a normally closed pilot valve 203 that is only open when pneumatic pressure is applied to valve 203 to open valve 200, as shown in FIG. 5. The orifice that sets the flow of cooling fluid can also be configured to set the desired flow rate and corresponding heat removal.

In another embodiment, a closed-loop temperature controller is utilized. In this embodiment, a thermocouple is attached to a key component inside the valve, such as the nosepiece or bonnet flange, for example. The thermocouple is the sensor of a temperature control system, where the actuator of the control system is a pilot valve that modulates the flow of cooling fluid. A temperature set point can be applied to the temperature control system that causes the system to operate when the set point is reached.

The implementations illustrated and described in detail above are bellows-sealed poppet isolation valves. However, the same techniques could be applied to a valve that uses dynamic sliding shaft seals rather than a bellows. A shaft-sealed valve will also be subjected to thermal loads on the nosepiece and stem and will have a thermal dissipation path with high resistance. According to exemplary embodiments, active cooling of the stem and nosepiece can be implemented in a similar manner as shown in FIG. 3.

Figure 6A:
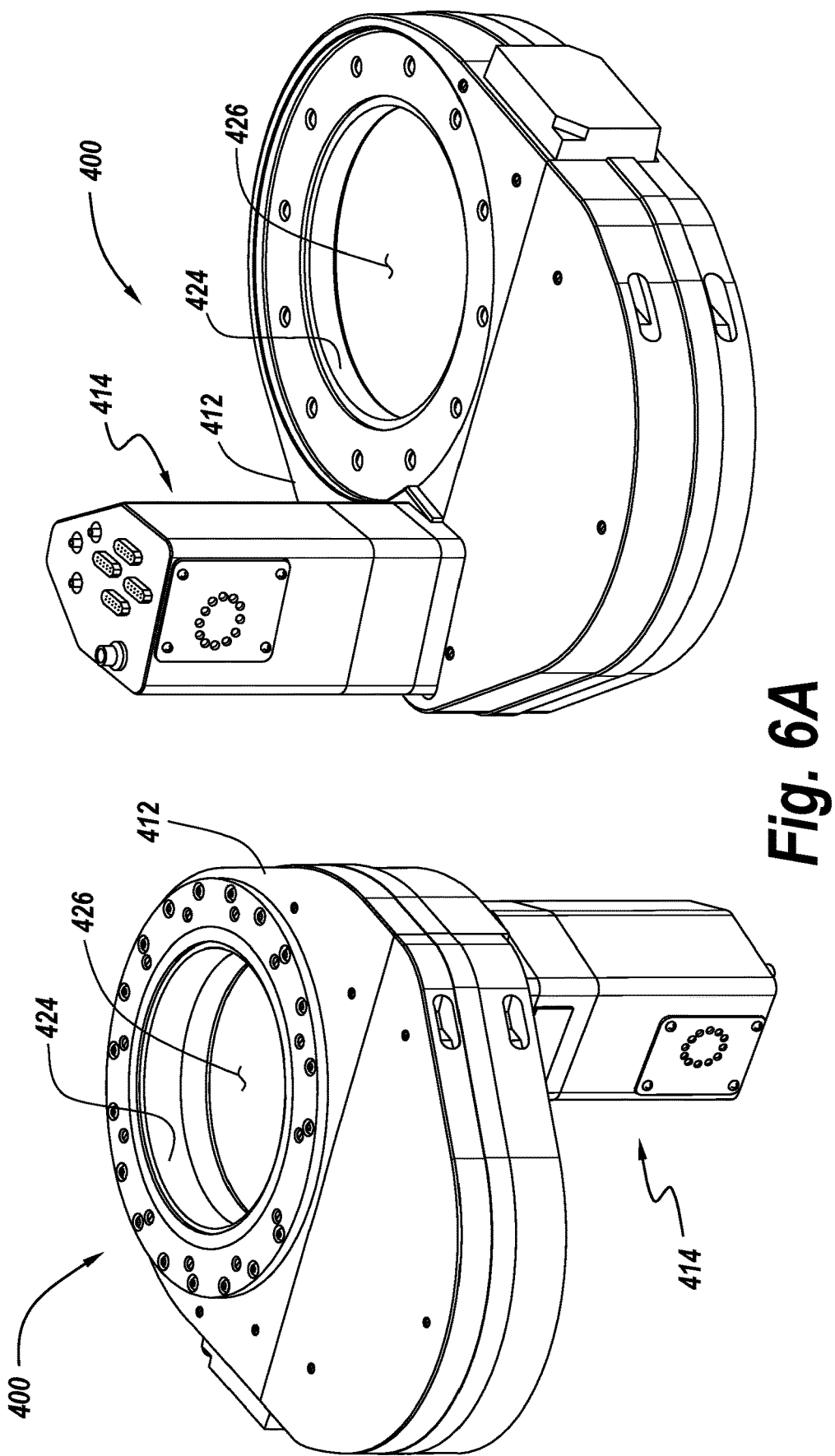
FIG. 6A includes two perspective views, rotated 180 degrees with respect to each other, of a pendulum/gate isolation valve with active cooling, according to some exemplary embodiments.

According to some exemplary embodiments, the active cooling techniques described herein can also be applied to pendulum/gate isolation valves. FIG. 6A includes two perspective views, rotated 180 degrees with respect to each other, of a pendulum/gate isolation valve 400 with active cooling, according to some exemplary embodiments. FIG.

6B is a schematic top cross-sectional view of pendulum/gate isolation valve 400 with active cooling of FIG. 6A, according to some exemplary embodiments. FIG. 6C is a schematic side cross-sectional enlarged detail view of pendulum/gate isolation valve 400 with active cooling of FIG. 6A, according to some exemplary embodiments.

Figure 6B:
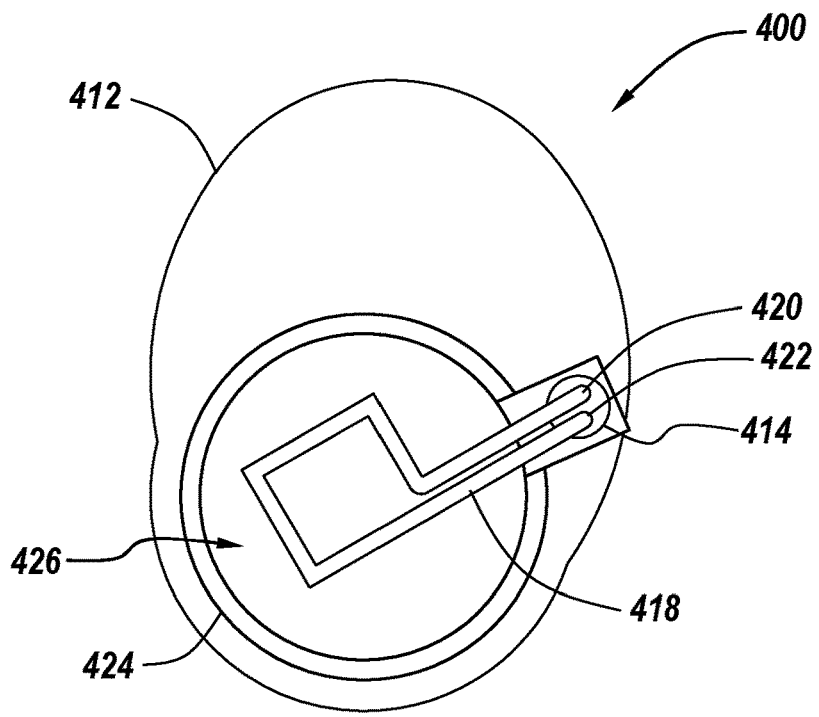
FIG. 6B is a schematic top cross-sectional view of the pendulum/gate isolation valve with active cooling of FIG. 6A, according to some exemplary embodiments.
Figure 6C:
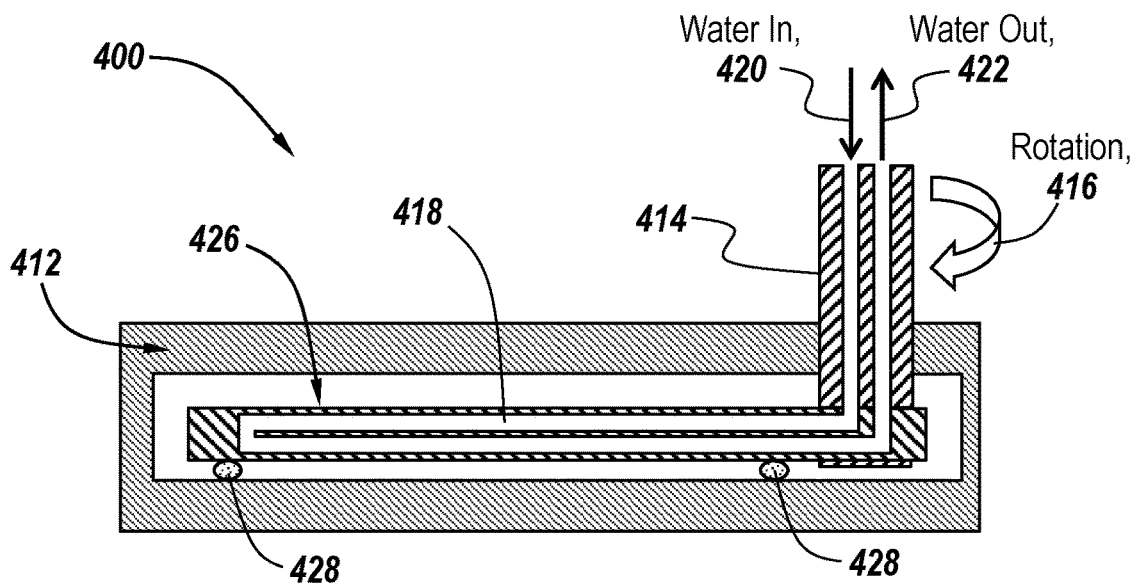
FIG. 6C is a schematic side cross-sectional enlarged detail view of the pendulum/gate isolation valve with active cooling of FIG. 6A, according to some exemplary embodiments.

Referring to FIGS. 6A-6C, pendulum/gate isolation valve 400 operates by controllably opening and closing a path through valve body 412 via opening or port 424. As with all of the embodiments of actively cooled valves described herein, pendulum/gate valve 400 can be connected between, for example, a process chamber and a source of reactive process gas, such as a plasma generation system. Opening and closing of valve 400 is effected by movement of gate 426 between the closed position illustrated in FIGS. 6A-6C, in which flow between input and output ports is blocked, and an open position, in which input and output ports 424 are in communication with each other across valve 400. Gate 426 is moved by rotation of shaft/actuator 414, to which gate 426 is fixedly attached. Rotation of shaft/actuator 414 is indicated schematically by arrow 416 in FIG. 6C. As also illustrated in FIG. 6C, gate 426 moves within body 412 and can be sealed to the interior of body 412, such as by O-ring seals 428.

As noted above, valve 400 is actively cooled. In some exemplary embodiments, active cooling is effected by circulation of a cooling fluid, such as air, nitrogen (N2), water, or other such fluid, through cooling channel 418 formed in gate 426. The fluid enters cooling channel 418 at fluid inlet 420, circulated through gate 426 in cooling channel 418, and exits cooling channel 418 through fluid outlet 422, thus carrying heat away from gate 426 and valve 400.

Figure 7A:
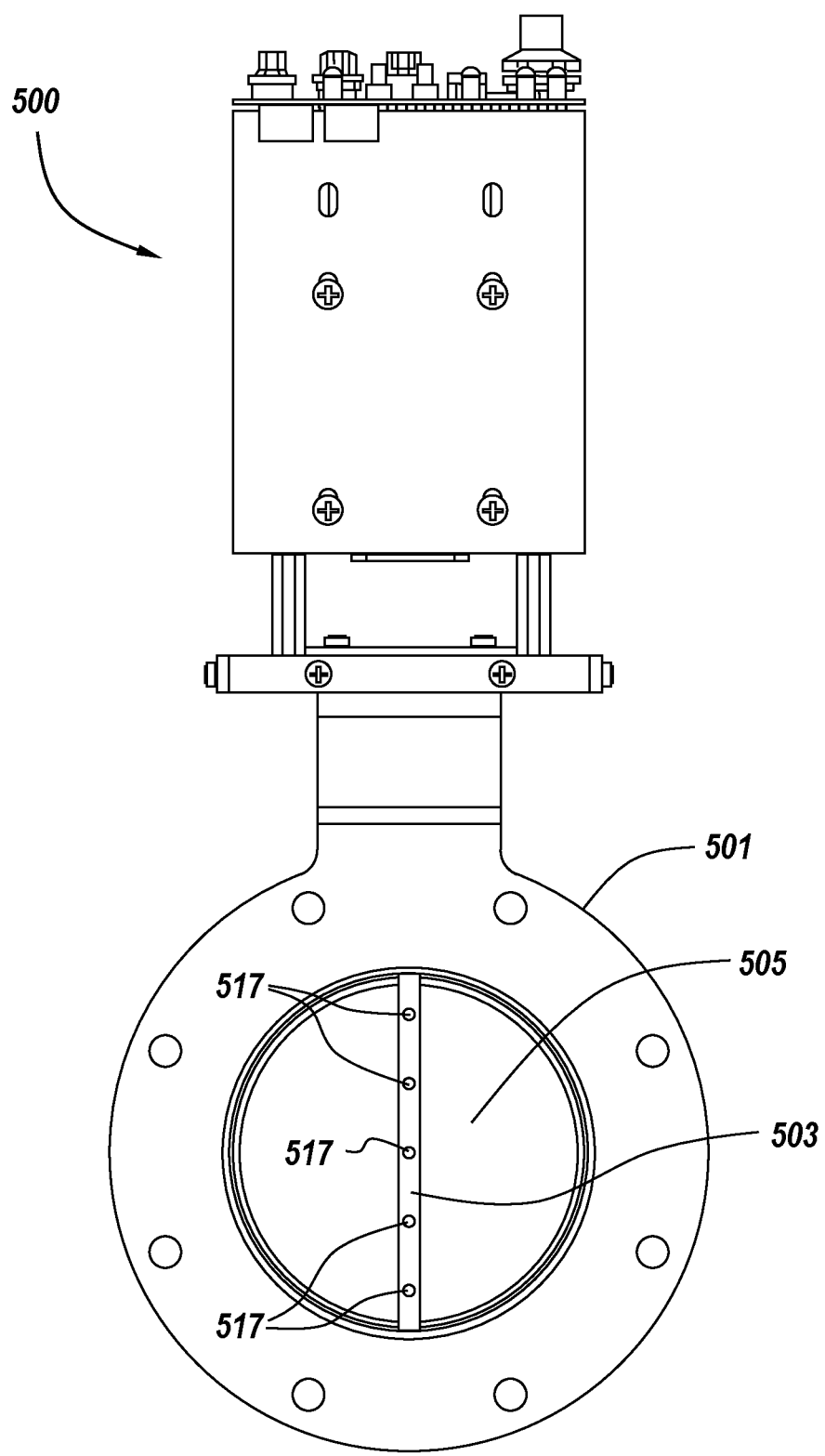
FIG. 7A includes a pictorial view of a butterfly pressure control valve.

According to some exemplary embodiments, the active cooling techniques described herein can also be applied to butterfly pressure control valves. FIG. 7A includes a pictorial view of a butterfly pressure control valve 500. Referring to FIG. 7A, valve 500 includes a flapper 505, which rotates with fixedly attached shaft 503 between open and closed positions. Flapper 505 can be attached to shaft 503 by screws 517 or other similar means. In the open position, flow through valve body 501 is enabled. With rotation of shaft 503 and, therefore, flapper 505 to the closed position illustrated in FIG. 7A, flow through valve body 501 is disabled. Butterfly pressure control valve 500 commonly operates with very small radial clearances between flapper 505 and valve body 501. Flapper 505 is subjected to heat loads from the process gas, and can expand, reducing the clearance between flapper 505 and valve body 501. In many cases, flapper 505 can contact valve body 501, which can cause particle generation, jamming or seizing. According to exemplary embodiments, a cooling fluid applied to flapper 505 via flapper shaft 503 limits the temperature of flapper 505 and resolves this failure mechanism.

Figure 7B:
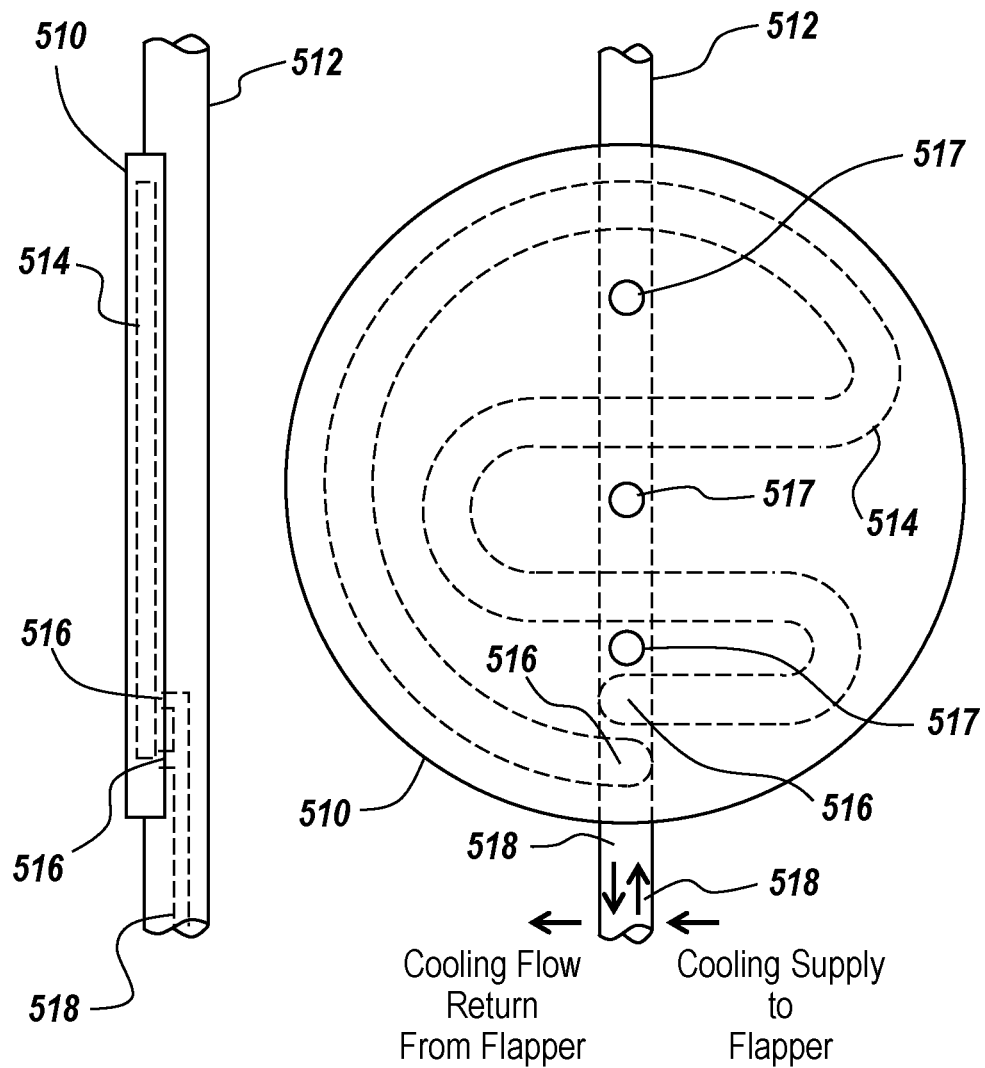
FIG. 7B includes two schematic diagrams, rotated 90 degrees with respect to each other, of a flapper for a butterfly control valve with active cooling, according to some exemplary embodiments.

FIG. 7B includes two schematic diagrams, rotated 90 degrees with respect to each other, of a flapper 510 for a butterfly control valve with active cooling, according to some exemplary embodiments. Referring to FIG. 7B, cooling channel 514 can be formed by machining a water channel in flapper 510 of the butterfly valve, then furnace brazing a cover plate to form a leak tight assembly. Shaft 512, fixedly attached to flapper 510, such as by screws 517 or other such means, includes two small axial passages 518, cross drilled for connections to the outside interfaces and to flapper 510. Flow of coolant is according to the arrows in FIG. 7B. O-rings 516 are used to form a seal between flapper 510 and shaft 512.

According to exemplary embodiments, a vacuum valve has a seat and a movable plate. The movable plate provides a seal against the seat when the valve is in the closed position. The movable plate moves away from the seat in order to allow process fluid to pass through the valve when the valve is in the open position. The movable plate includes a separate and isolated internal cooling path that allows an independent cooling fluid to remove heat from the movable plate.

In some embodiments, the separate and isolated cooling path includes movable and non-movable components of the valve. In some embodiments, the valve includes a bellows to isolate the process fluid from the outside environment. In some embodiments, the bellows separates part of the cooling path from the process fluid. In some embodiments, the valve includes dynamic seals between components with relative motion in order to isolate the process fluid from the outside environment. In some embodiments, the flow of cooling fluid is switched off when the valve is in the closed position.

In some embodiments, the vacuum valve includes a temperature sensor measuring the temperature of the valve and a pilot valve that modules the flow of the cooling fluid in order to regulate the temperature of the valve as measured by the temperature sensor. In some embodiments, the vacuum valve includes a shield attached to the moving part of the valve to shield the external surface of the bellows from direct exposure to the process fluid. In some embodiments, the vacuum valve includes a secondary fixed shield in close proximity or adjacent to the moving shield. In some embodiments, the process gas is a reactive gas.

It is noted that, in the embodiments of poppet isolation valves 100, 200 illustrated in FIGS. 2, 3A-3D, 4A, 4B and 5 and described above in detail, the bellows and pneumatic control elements are axially stacked, that is, they are disposed longitudinally or vertically above/beneath each other. According to the present disclosure, in some exemplary embodiments, the bellows can be disposed at the same axial position and radially outward from the pneumatic control elements to at least partially axially overlap with and at least partially enclose or cover the pneumatic control elements. This configuration results in a more compact valve structure.

Figure 8A:
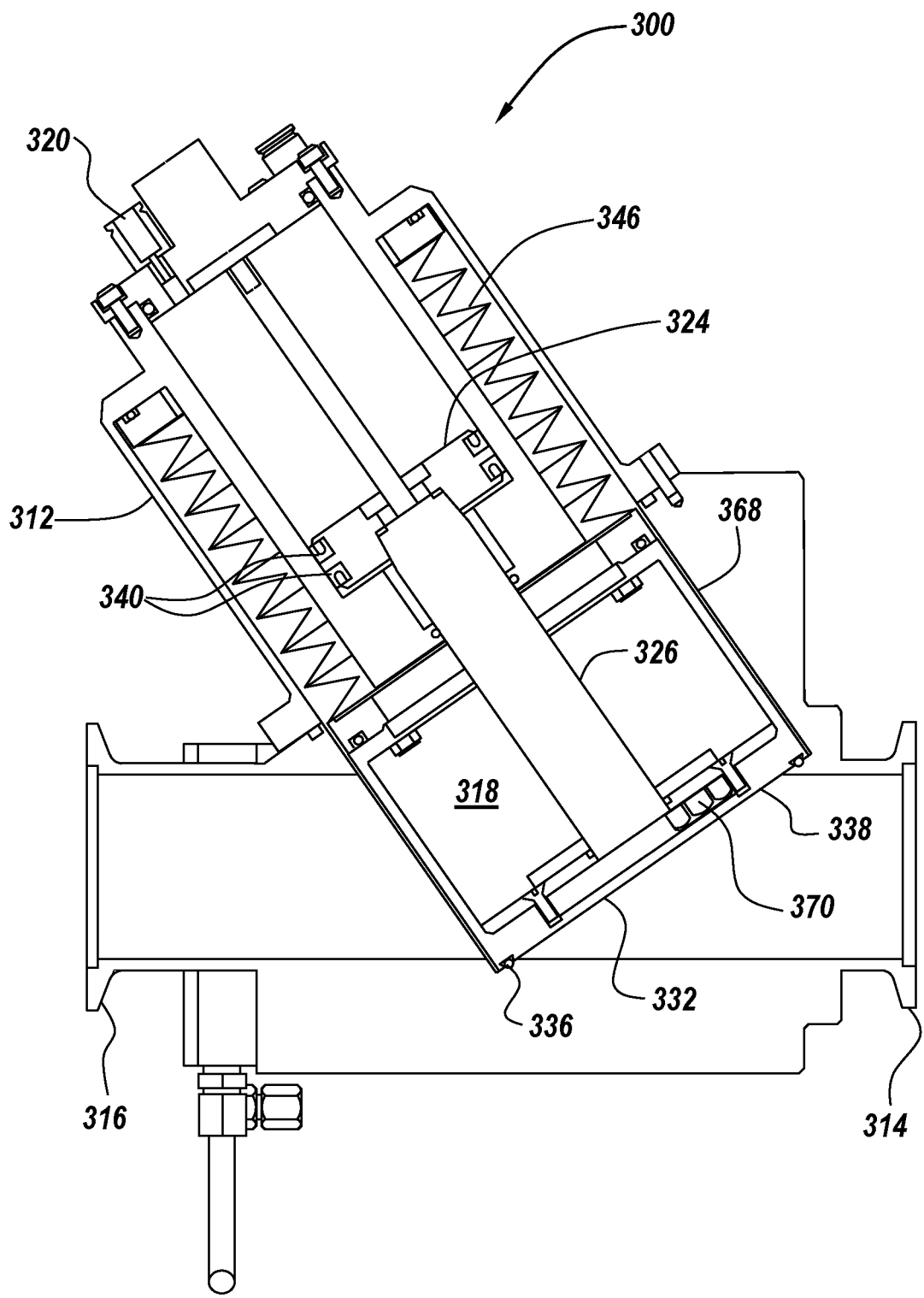
FIG. 8A includes a schematic cross-sectional view of a bellows-sealed poppet isolation valve with active cooling, in which the bellows is disposed radially adjacent to and outward of pneumatic control elements, in a closed state, according to some exemplary embodiments.
Figure 8B:
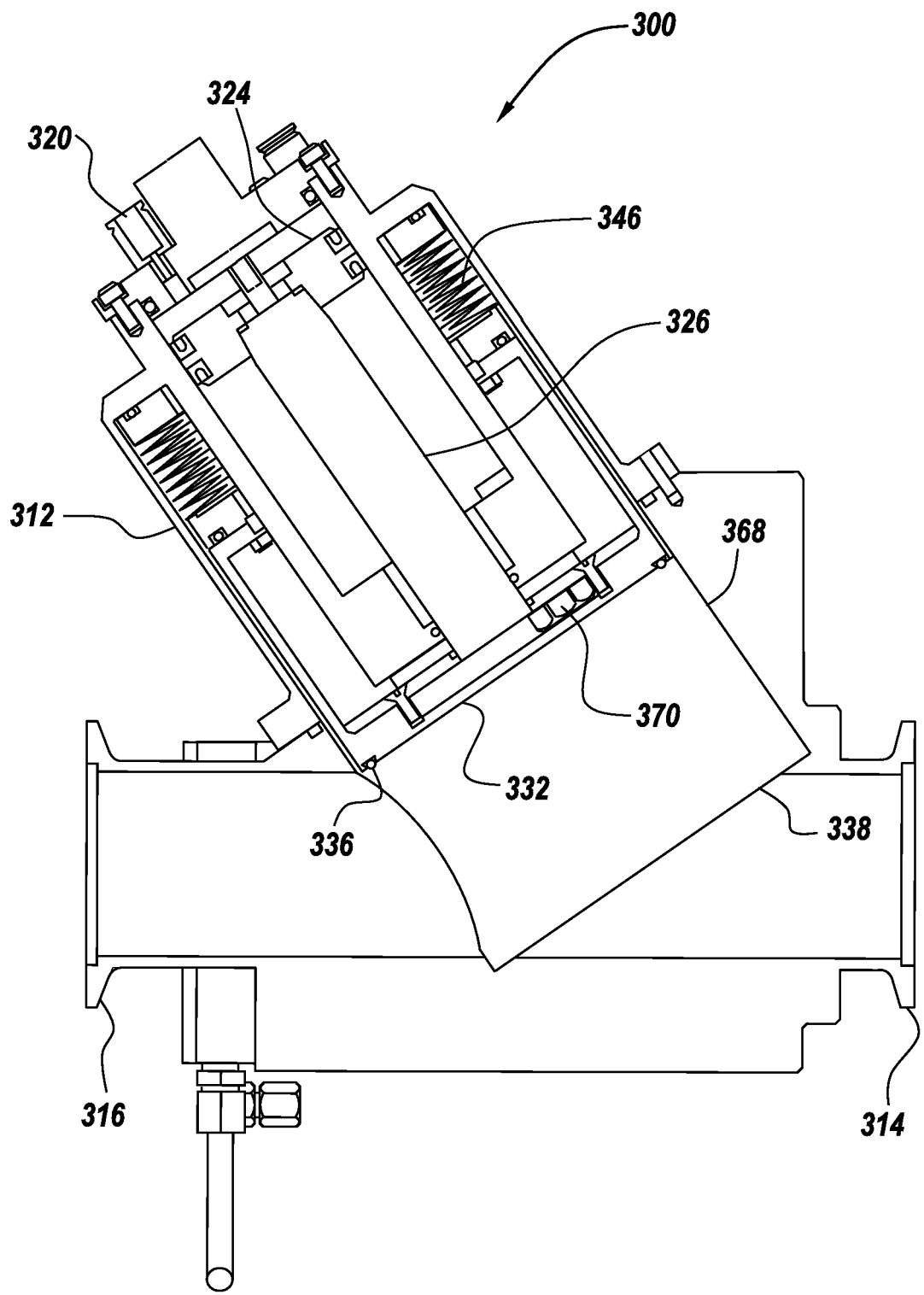
FIG. 8B includes a schematic cross-sectional view of the bellows-sealed poppet isolation valve of FIG. 8A, in an open state, according to some exemplary embodiments.
Figure 9A:
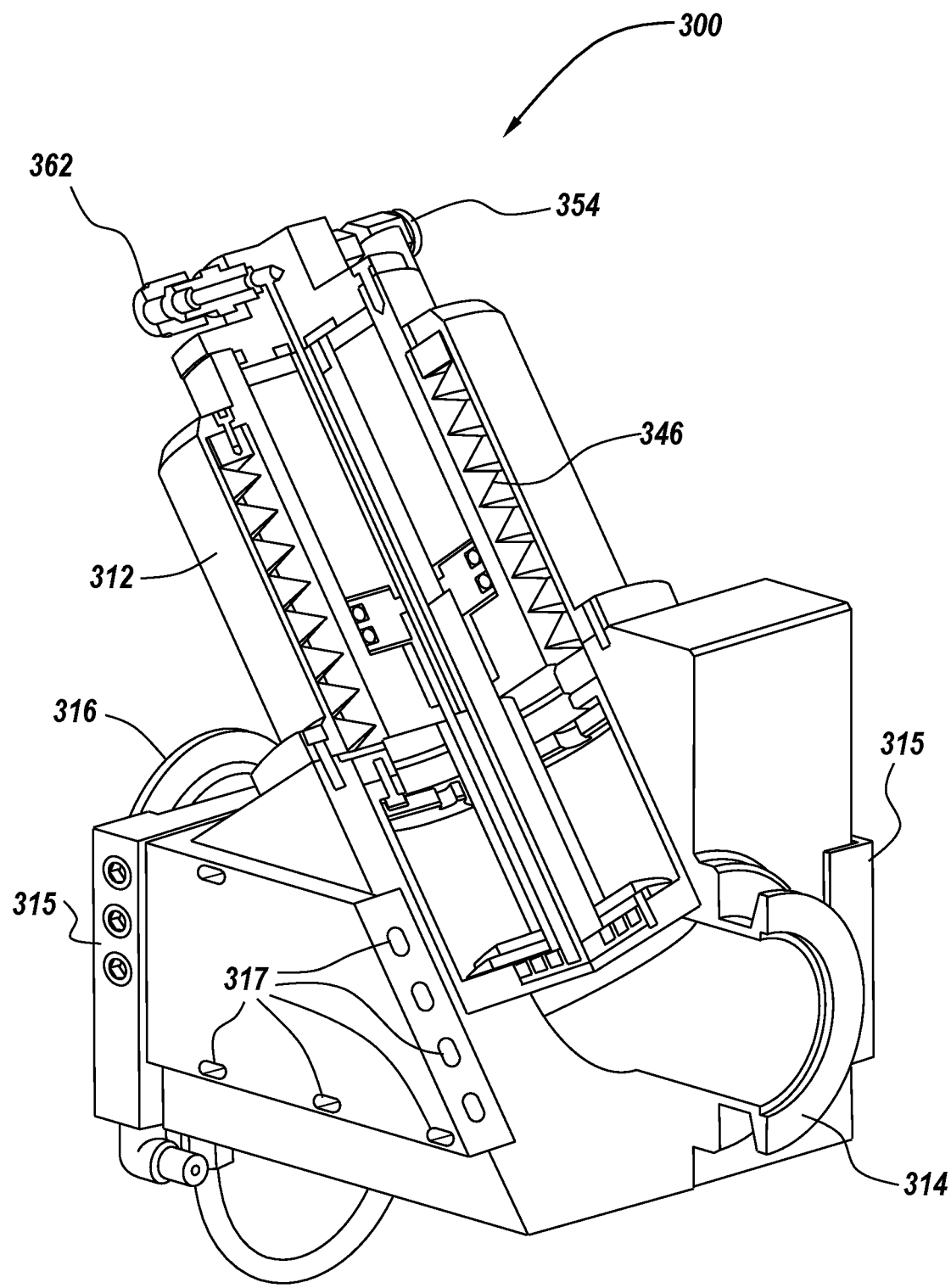
FIG. 9A includes a schematic partially cut-away perspective view of the bellows-sealed poppet isolation valve of FIG. 8A, in a closed state, according to some exemplary embodiments.
Figure 9B:
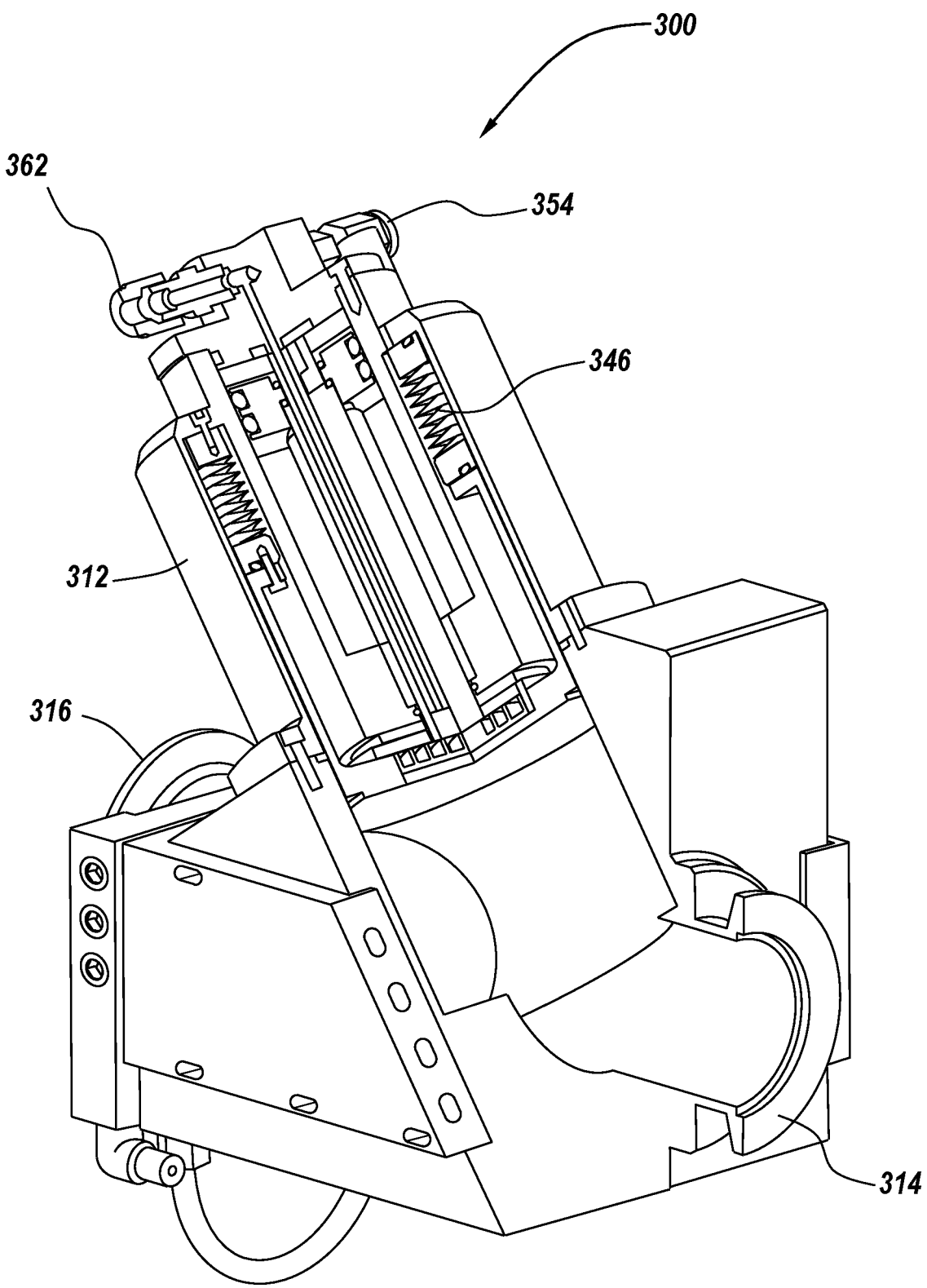
FIG. 9B includes a schematic partially cut-away perspective view of the bellows-sealed poppet isolation valve 300 of FIG. 8A, in an open state, according to some exemplary embodiments.
Figure 10A:
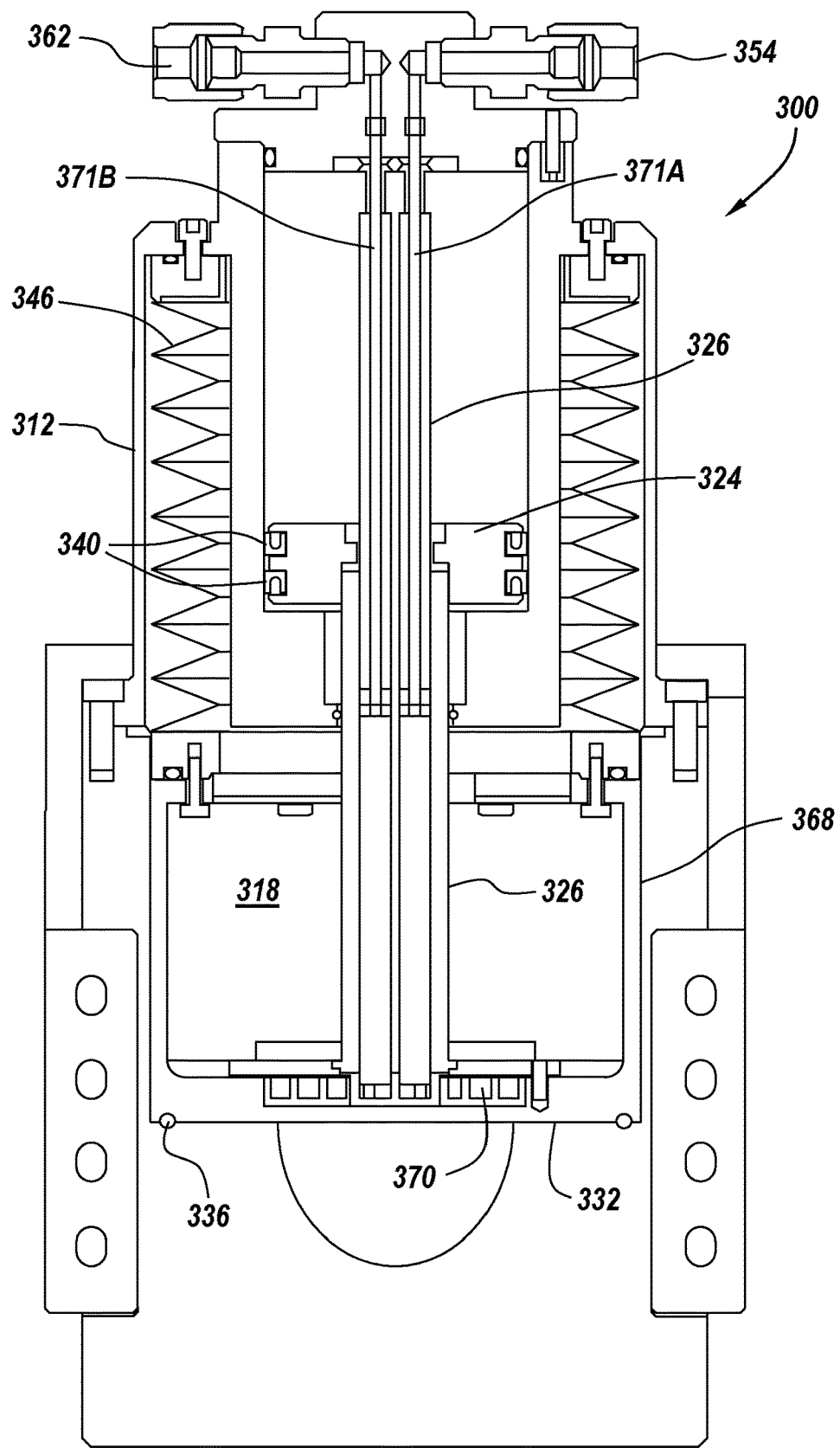
FIG. 10A includes a schematic cross-sectional view of the bellows-sealed poppet isolation valve of FIG. 8A, in a closed state, according to some exemplary embodiments.
Figure 10B:
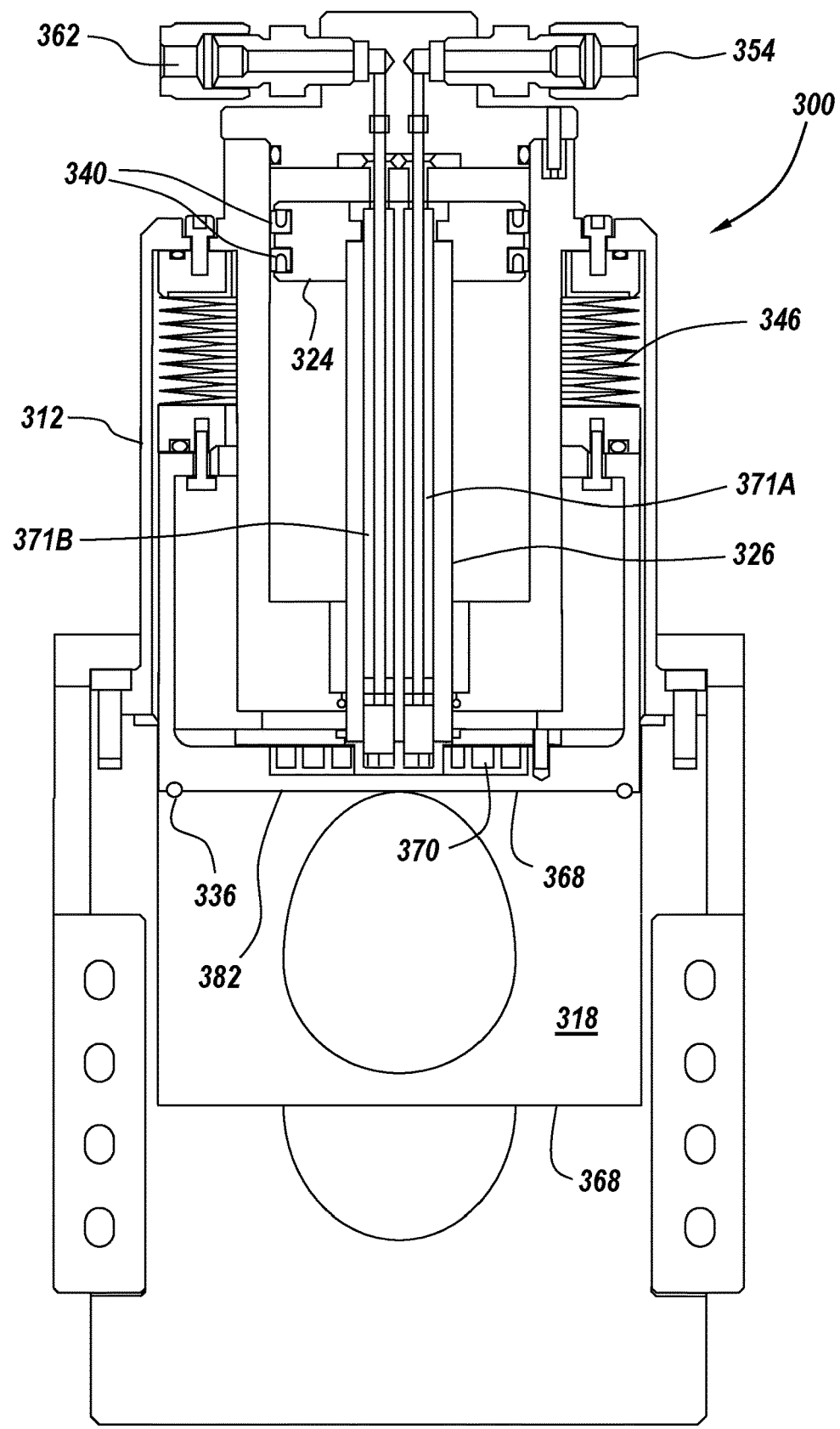
FIG. 10B includes a schematic cross-sectional view of the bellows-sealed poppet isolation valve of FIG. 8A, in an open state, according to some exemplary embodiments FIG. 11A includes a schematic perspective view of the bellows-sealed poppet isolation valve of FIG. 8A, according to some exemplary embodiments.
Figure 11A:
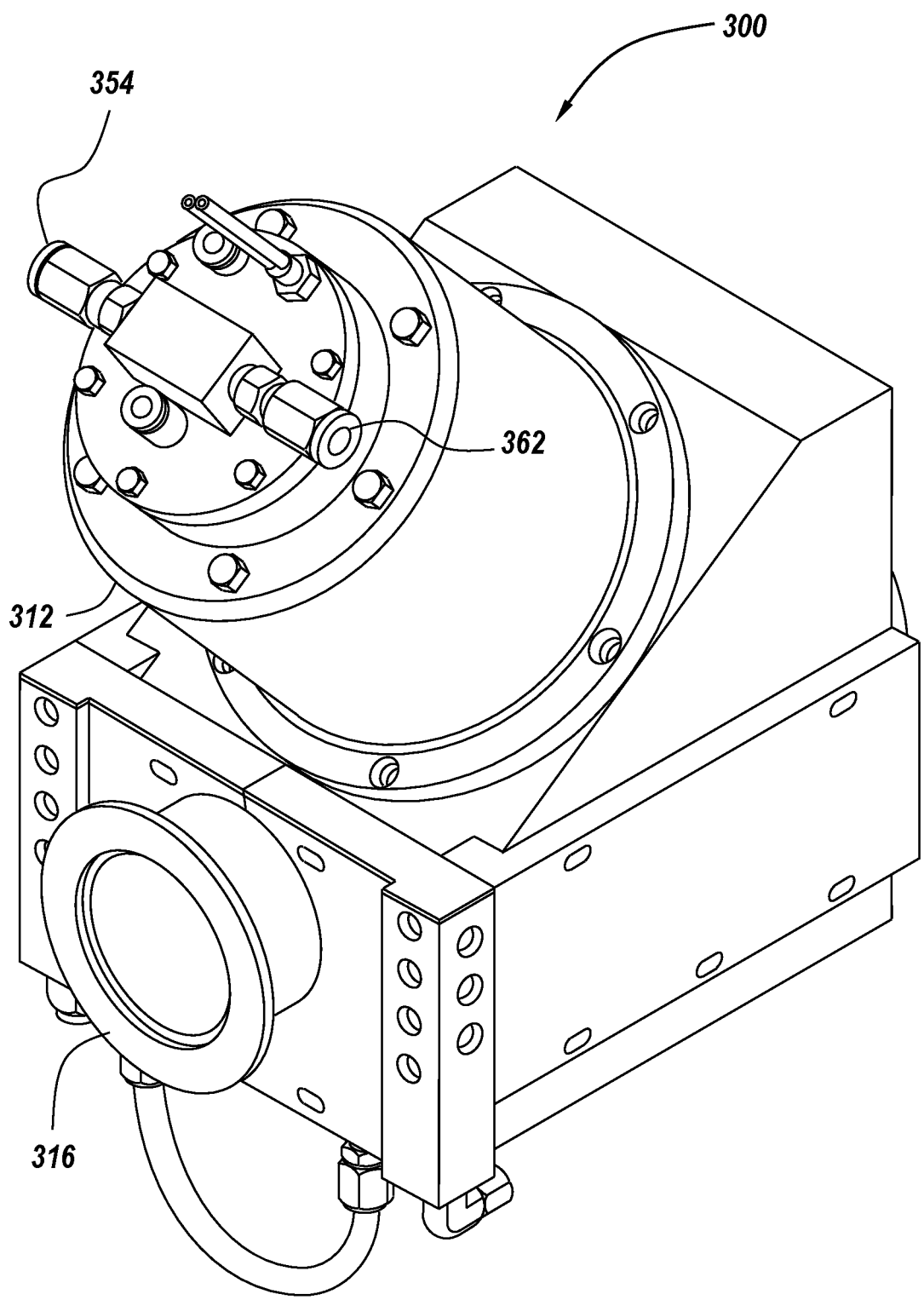
FIG. 11B includes a schematic perspective view of the bellows-sealed poppet isolation valve of FIG. 8A, rotated 90 degrees with respect to the view of FIG. 11A, according to some exemplary embodiments.
Figure 11B:
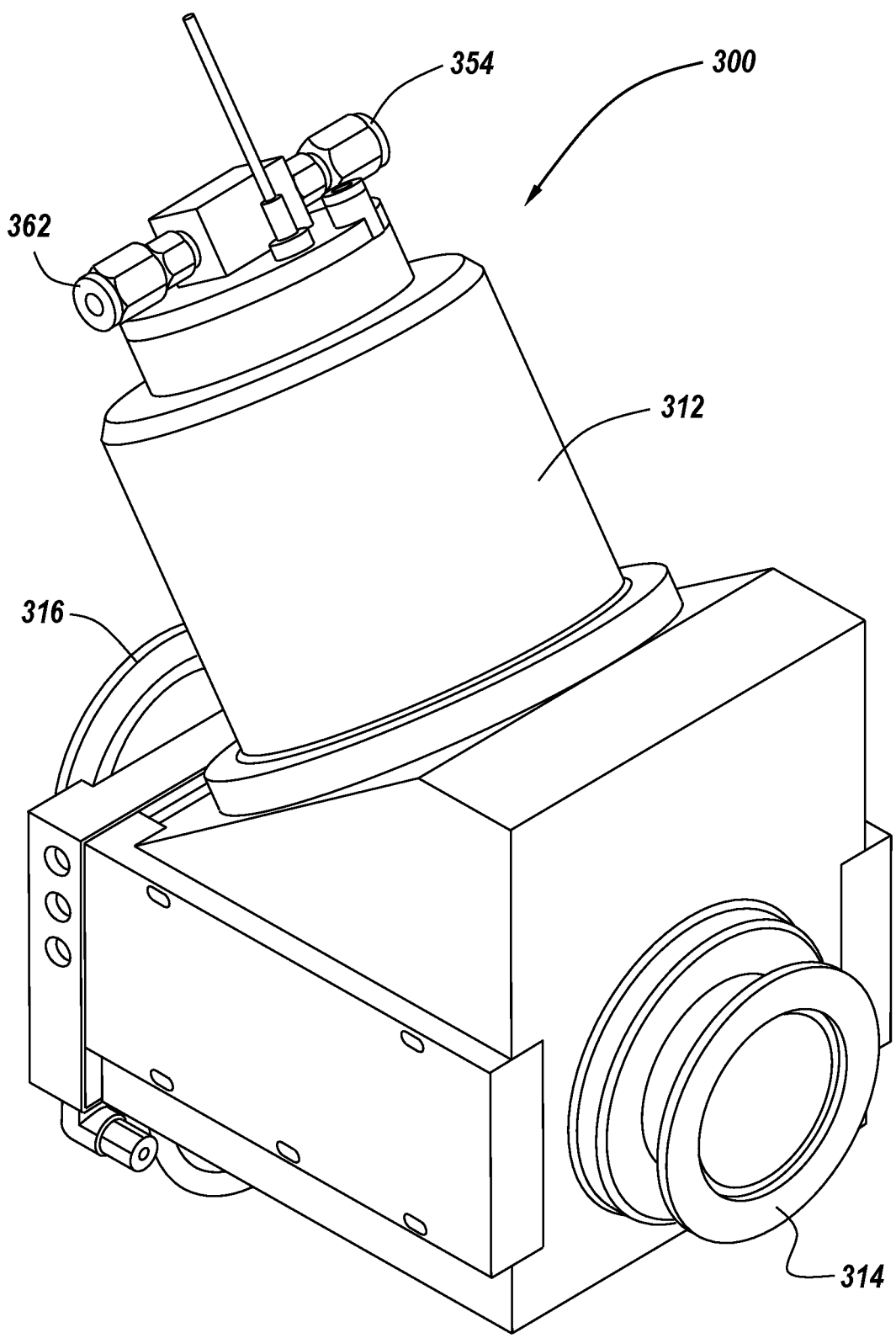

FIG. 8A includes a schematic cross-sectional view of a bellows-sealed poppet isolation valve 300 with active cooling, in which the bellows is disposed radially adjacent to and outward of pneumatic control elements, in a closed state, according to exemplary embodiments. FIG. 8B includes a schematic cross-sectional view of the bellows-sealed poppet isolation valve 300 of FIG. 8A, in an open state, according to exemplary embodiments. FIG. 9A includes a schematic partially cut-away perspective view of the bellows-sealed poppet isolation valve 300 of FIG. 8A, in a closed state, according to exemplary embodiments. FIG. 9B includes a schematic partially cut-away perspective view of the bellows-sealed poppet isolation valve 300 of FIG. 9A, in an open state, according to exemplary embodiments. FIG. 10A includes a schematic cross-sectional view of the bellows-sealed poppet isolation valve 300 of FIG. 8A, in a closed state, according to exemplary embodiments. FIG. 10B includes a schematic cross-sectional view of the bellows-sealed poppet isolation valve 300 of FIG. 8A, in an open state, according to exemplary embodiments. FIG. 11A includes a schematic perspective view of the bellows-sealed poppet isolation valve 300 of FIG. 8A, according to exemplary embodiments. FIG. 11B includes a schematic perspective view of the bellows-sealed poppet isolation valve 300 of FIG. 8A, rotated 90 degrees with respect to the view of FIG. 11A, according to exemplary embodiments.

Referring to FIGS. 8A, 8B, 9A, 9B, 10A, 10B, 11A and 11B, valve 300 includes valve body 312 which encloses at least the internal low-pressure chamber 318 of valve 300. Valve flanges 314 and 316 are used to fixedly connect valve 300 between, for example, a processing chamber (not shown) and a source of reactive gases, such as a plasma generation system (not shown).

In the closed state of valve 300 illustrated in FIGS. 8A, 9A and 10A, actively cooled nosepiece 332 is sealed via nosepiece vacuum seal or nosepiece O-ring 336 to valve seat 338. In this closed state, valve 300 isolates valve inlet and outlet at flanges 314 and 316, for example, to isolate the processing chamber from the source of reactive gases. Shield 368 protects internal components of valve 300, such as bellows 346, valve stem 326, nosepiece 332, nosepiece seals 336, and other components from the environment, such as reactive process gases, to which internal chamber 318 is exposed.

Valve 300 can be controlled pneumatically via a pneumatic air inlet 320. High-pressure air introduced at air inlet 320 causes pneumatic piston 324 to move downwardly, carrying the fixedly attached stem 326 in the downward direction. Pneumatic seals 340 seal the pneumatic chamber to maintain elevated air pressure needed to actuate pneumatic piston 324. Actively cooled nosepiece 332 is fixedly attached to the end of stem 326 and is forced downwardly toward seat 338 where nosepiece seals 336 contact and seal against seat 338 to close valve 300, such that valve inlet and outlet ports are isolated from each other and cannot communicate across internal chamber 318. This prevents, for example, reactive gases from flowing from the reactive gas source to the processing chamber.

When high-pressure air is not being introduced at air inlet 320, valve 300 is controlled to transition to and remain in the open state. In the open state, as illustrated in FIGS. 8B, 9B and 10B, pneumatic piston 324 has moved upwardly, carrying the fixedly attached stem 326 in the upward direction. As a result, nosepiece 332 and nosepiece O-ring seal 336 are moved away from seat 338 to open valve 300, such that valve inlet and outlet communicate across internal chamber 318. This allows, for example, reactive gases to flow from the reactive gas source to the processing chamber. Shield 368 protects internal components of valve 300, such as bellows 346, valve stem 326, nosepiece 332, nosepiece seals 336, and other components from the environment, such as reactive process gases, to which internal chamber 318 is exposed.

As noted above valve 300 includes active cooling which is analogous to the active cooling described above in detail in connection with FIGS. 2, 3A-3D, 4A and 4B. The details of active cooling described above are applicable to valve 300 as well. Continuing to refer to FIGS. 8A, 8B, 9A, 9B, 10A, 10B, 11A and 11B, actively cooled valve 300 includes an active cooling channel integrated into the structure. The cooling fluid, e.g., air, nitrogen (N2), water, or other such fluid, enters cooling channel 371A formed in stem 326 of valve 300 at cooling inlet 354 and flows through an axial channel 371A in stem 326, and then into a serpentine or spiral groove or channel 370 in nosepiece 332, the spiral groove or channel 370 being configured to optimize surface area and heat transfer. The fluid flows radially outward through spiral groove or channel 370 formed in nosepiece 332. The fluid then exits spiral groove or channel 370 and enters a second axial channel 371B in stem 326. The fluid flows back up through second axial channel 371B in stem 326 and out of valve 300 via cooling fluid outlet 362. The fluid can then be ducted to a facility exhaust system to avoid generating turbulence that is undesirable in a clean room environment. In the case of a liquid cooling fluid, the fluid can be collected and disposed of, or it may be recycled through the valve, either with or without temperature control of the fluid.

As illustrated in particular in FIGS. 9A and 9B, valve 300 can include cooling plates 315, made of a thermally conductive material such as copper, which can be fixedly attached, e.g., bolted, to valve body 312 in a thermally conductive manner. Cooling plates 315 can include internal cooling passages 317. These cooling plates 315 remove heat from valve body 312, which is thermally conductively coupled to valve seat 338. As a result, O-ring sealing surfaces are cooled, i.e., kept at moderate temperatures, via conduction.

In the various embodiments of isolation valves described in detail above, O-ring seals such as, for example, nosepiece O-ring seals 136, 236, 336, are used to seal nosepieces 132, 232 and 332 to valve seats 138, 238 and 338, respectively. O-rings are typically disposed and retained within a groove or gland, such as, for example, groove or gland 137 illustrated in FIGS. 3C and 3D, for retaining nosepiece O-ring seal 136. It will be understood that, although in the embodiments described herein in detail, the groove or gland is formed in the nosepiece, not the valve seat. It will be understood that, in general, O-ring seals can be retained within grooves or glands formed in either the nosepiece or the valve seat.

Figure 12A:
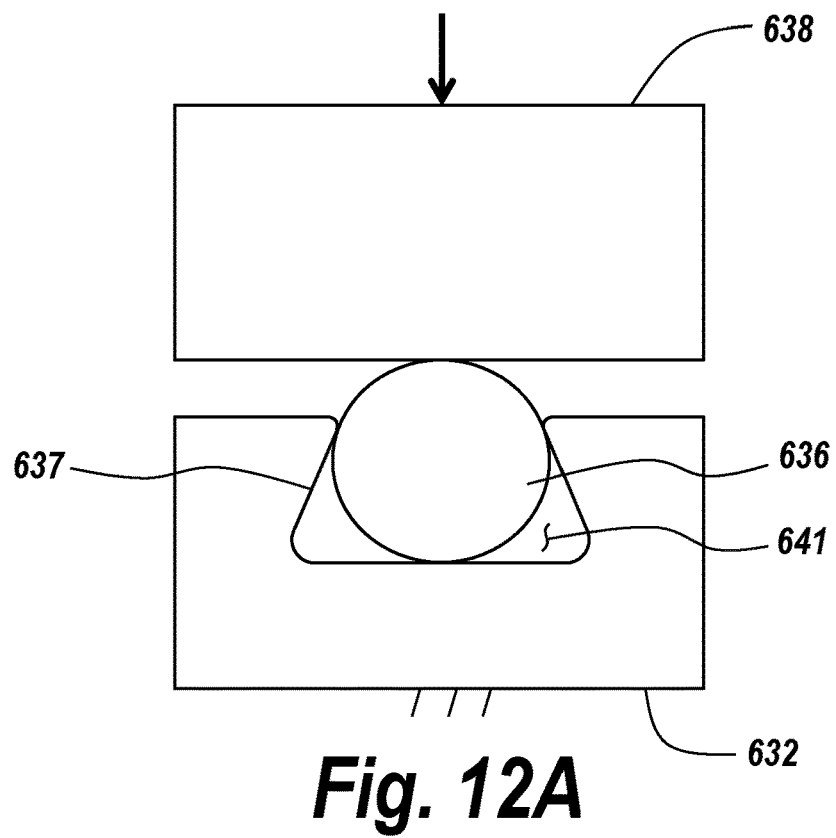
FIG. 12A includes a schematic detailed cross-sectional diagram of a conventional O-ring seal configuration, at initial contact of the O-ring.
Figure 12B:
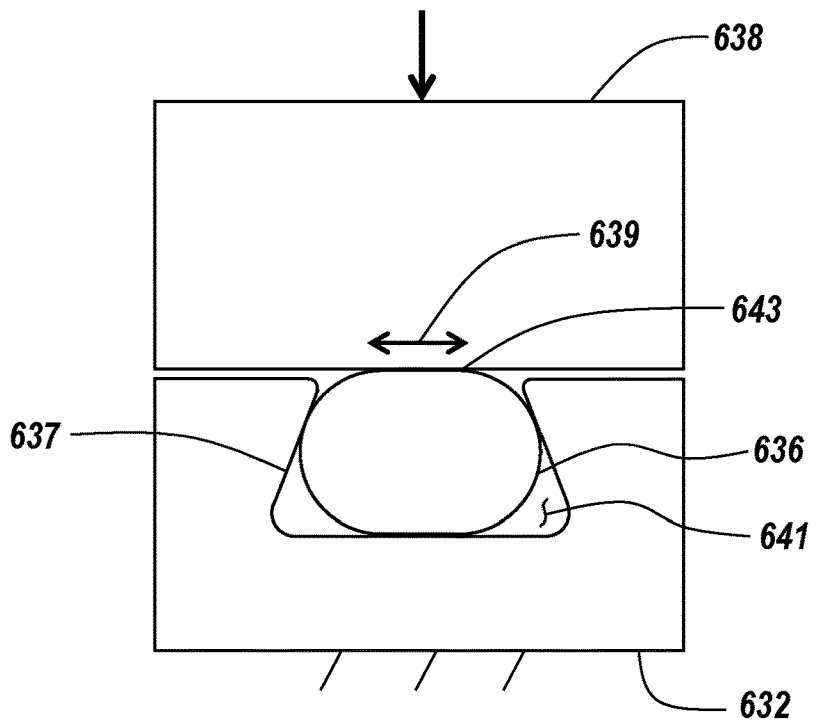
FIG. 12B includes a schematic detailed cross-sectional diagram of the conventional O-ring seal configuration of FIG. 12A, with the O-ring fully compressed.

FIGS. 12A and 12B include schematic detailed cross-sectional diagrams of a conventional O-ring seal configuration. Specifically, FIG. 12A includes a schematic detailed cross-sectional diagram of the conventional O-ring seal configuration at initial contact of the O-ring, and FIG. 12B includes a schematic detailed cross-sectional diagram of the conventional O-ring seal configuration of FIG. 12A with the O-ring fully compressed. Referring to FIGS. 12A and 12B, groove or gland 637 is formed in a base 632, for example, a poppet valve nosepiece as described herein in detail in connection with the various exemplary embodiments. O-ring seal 636 is disposed and retained within groove or gland 637. In the particular embodiment illustrated in FIGS. 12A and 12B, groove or gland 637 is dove-tail shaped in cross-section, which facilitates retention of O-ring 636 in groove or gland 637. In the O-ring configuration illustrated in FIGS. 12A and 12B, gland 637 is not filled completely by O-ring 636. This incomplete gland fill allows O-ring 636 to expand as the seal is compressed and uncompressed, and allows for growth of O-ring 636 during thermal expansion. That is, incomplete gland fill leaves "airspace" 641 and allows O-ring 636 to expand and still remain elastic.

Continuing to refer to FIGS. 12A and 12B, this conventional O-ring configuration has certain drawbacks, particularly under the thermal cycling extremes experienced by the various embodiments of actively cooled isolation valves described herein in detail. In the case, for example, of a reactive gas isolation valve, the temperature cycling of the valve can be according to the following. At first, the valve is cool. Then, the valve opens, and reactive gas flows through the valve, which introduces a heat load to all surfaces. As a result, O-ring 636 expands faster than the surrounding metal, and expands out of gland 637. Next, when the valve closes, the heat load is removed. As the surfaces cool, O-ring 636 contracts faster than the surrounding seat 638 and dovetail gland 637. O-ring contact patch 643 will get smaller as O-ring 636 cools, while under full compressive load. The result is that either O-ring 636 will experience sliding friction with seat 638 while under full compression as indicated by arrow 639, or O-ring friction will exceed the contraction forces, and the O-ring material will be under significant stress. Both of these mechanisms will result in premature wear of O-ring 636.

Figure 13A:
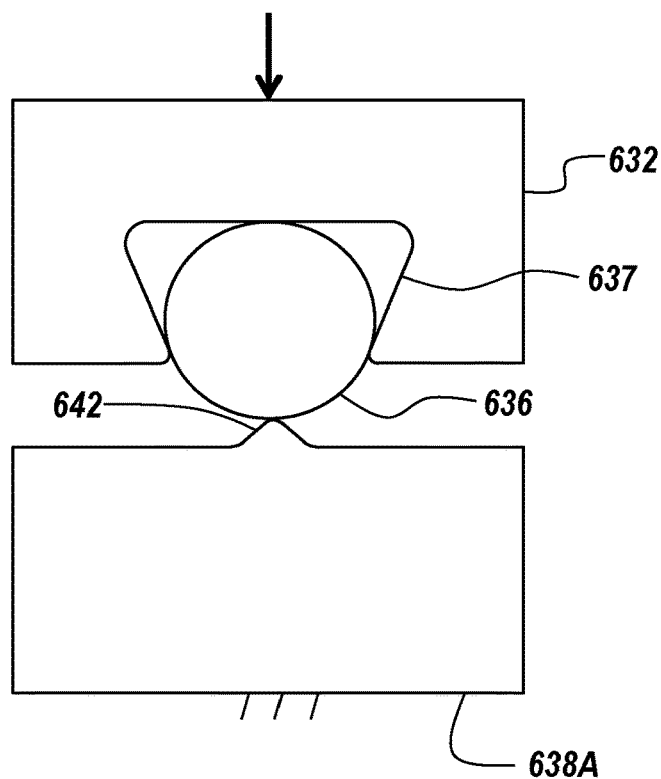
FIG. 13A includes a schematic detailed cross-sectional diagram of an O-ring seal configuration with reduced O-ring wear, at initial contact of the O-ring, according to some exemplary embodiments.
Figure 13B:
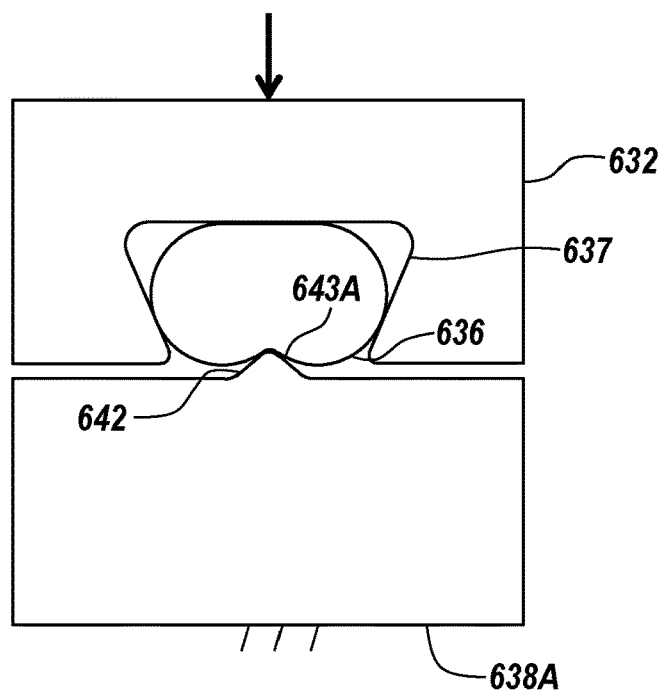
FIG. 13B includes a schematic detailed cross-sectional diagram of the O-ring seal configuration of FIG. 13A, with the O-ring fully compressed, according to some exemplary embodiments.

FIGS. 13A and 13B include schematic detailed cross-sectional diagrams of an O-ring seal configuration in which wear of O-ring 636 under temperature variations is substantially reduced, according to some exemplary embodiments. Specifically, FIG. 13A includes a schematic detailed cross-sectional diagram of the O-ring seal configuration with reduced O-ring wear at initial contact of O-ring 636, and FIG. 13B includes a schematic detailed cross-sectional diagram of the O-ring seal configuration of FIG. 13A with O-ring 636 fully compressed. Referring to FIGS. 13A and 13B, the configuration includes a modified seat 638A, which includes a protrusion 642 contacting the top surface of O-ring 636. This increases compression in the center of O-ring 636 and reduces compression at the edges of contact patch 643A. As O-ring 636 cools and contracts, the part of O-ring 636 subject to the highest amount of movement, i.e., at the edge of contact patch 643A, is under little or no compression. The part of the O-ring that is under the highest compression does not move at all. In this configuration, the motion of O-ring 636 as it contracts is more of a rolling motion, rather than sliding under high friction and compressive forces. This results in reduced wear of O-ring 636 over repeated cycles. It should be noted that, in FIGS. 13A and 13B, seat 638A and base, e.g., nosepiece, 632 are flipped vertically with respect to seat 638 and base, e.g., nosepiece, 632 in FIGS. 12A and 12B.

Figure 14A:
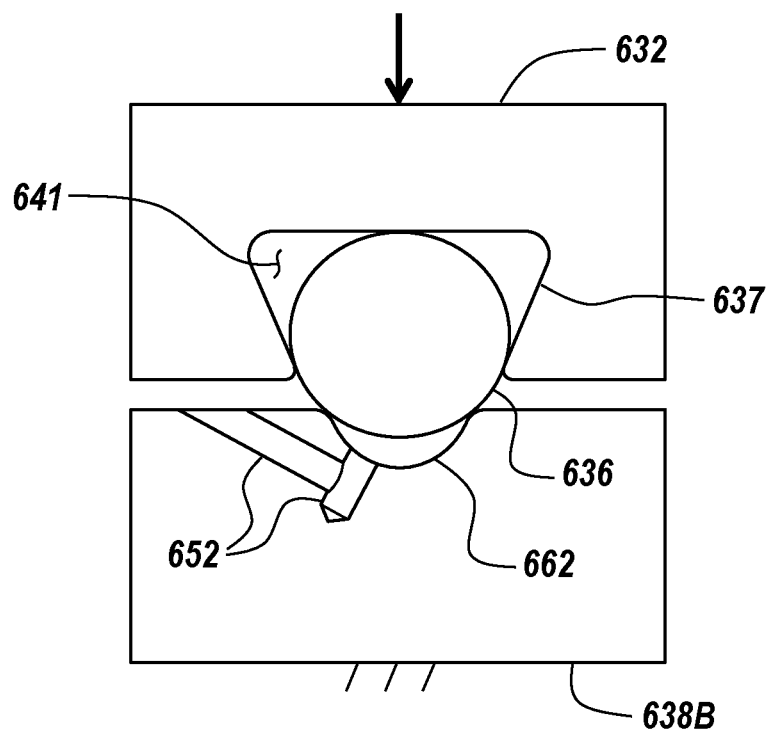
FIG. 14A includes a schematic detailed cross-sectional diagram of an O-ring seal configuration with reduced O-ring wear, at initial contact of the O-ring, according to some exemplary embodiments.
Figure 14B:
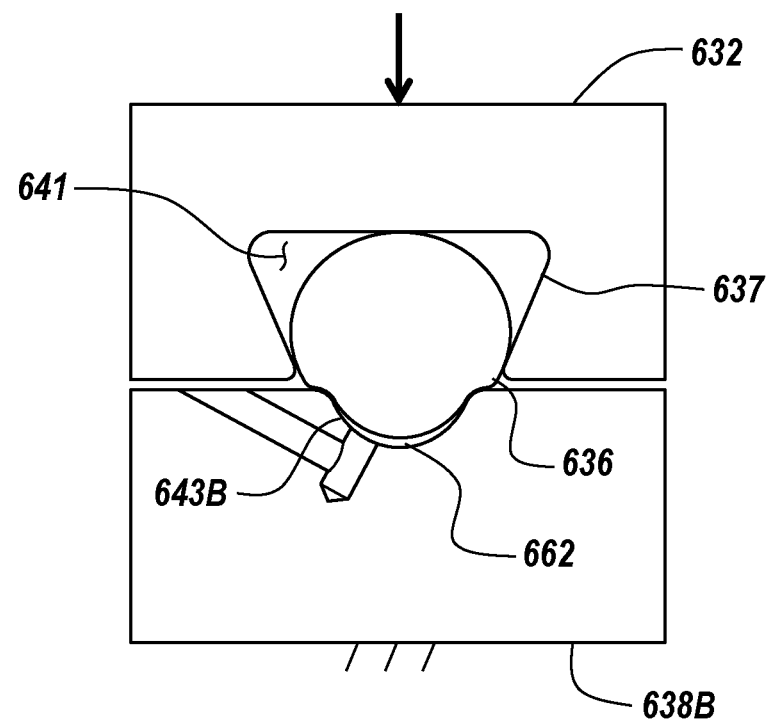
FIG. 14B includes a schematic detailed cross-sectional diagram of the O-ring seal configuration of FIG. 14A, with the O-ring fully compressed, according to some exemplary embodiments.

FIGS. 14A and 14B include schematic detailed cross-sectional diagrams of an O-ring seal configuration in which wear of O-ring 636 under temperature variations is substantially reduced, according to some exemplary embodiments. Specifically, FIG. 14A includes a schematic detailed cross-sectional diagram of the O-ring seal configuration with reduced O-ring wear at initial contact of O-ring 636, and FIG. 14B includes a schematic detailed cross-sectional diagram of the O-ring seal configuration of FIG. 14A with O-ring 636 fully compressed. Referring to FIGS. 14A and 14B, the configuration includes a modified seat 638B having a concave portion 662 contacting and capturing the top surface of O-ring 636. In this configuration, O-ring 636 is allowed to expand and contact into concave portion 662 of seat 638B, similar to the process at the airspace 641 of dovetail gland 637. As O-ring 636 cools under compression, the volume in concave portion 662 will increase, and the contact patch 643B and seal area on seat 638B will occur on a sloped region of concave portion 662 of seat 638B. As O-ring 636 contracts, this allows contact patch 643B to migrate along concave portion 662 of seat 638B without producing high stress to O-ring 636, or sliding under high friction forces. Optionally, intersecting holes 652 can be formed in seat 638B to equalize the pressure in the trapped volume of concave portion 662 of seat 638B. It should be noted that, in FIGS. 14A and 14B, seat 638B and base, e.g., nosepiece, 632 are flipped vertically with respect to seat 638 and base, e.g., nosepiece, 632 in FIGS. 12A and 12B.

In alternative embodiments, another approach to reducing O-ring stress includes maintaining the nosepiece and the seat at similar and relatively constant temperature. This can be accomplished by active fluid cooling both the nosepiece as illustrated and described in detail herein and the seat. By cooling both the seat and the nosepiece, the O-ring will see relatively constant temperature, regardless of the heat load present, and regardless of whether the O-ring is compresses or uncompressed. For example, if under all circumstances the nosepiece and seat have temperature excursions of less than, for example, 10 degrees C., stress to the O-ring will be relatively low. In contrast, if the O-ring experiences temperature gradients or excursions on the order of 100 degrees C., stresses in the O-ring will be much higher.

In the isolation valves of the various embodiments, the bellows are typically exposed to a highly corrosive environment. As a result, stress corrosion cracking of the bellows can occur. In some exemplary embodiments, a very thin coating of aluminum oxide is applied to the bellows. In some particular embodiments, the bellows are approximately 100 µm thick, and the coating of aluminum oxide is approximately 0.5 µm thick. Typically, bellows materials are limited to those that can be welded, for example, stainless steel, Inconel or other such material. However, stainless steel has limited corrosion resistance to the process chemistry. In contrast, aluminum oxide has an advantage of a lower recombination rate for atomic fluorine, as compared to that of Inconel or stainless steel. The reduced recombination rate results in reduced heat load on the bellows and the overall system.

In order to produce a robust coating for a bellows that experiences significant strain, in some exemplary embodiments, the coating thickness is much thinner than the thickness of the substrate of the bellows. For example, in some particular exemplary embodiments, the thickness of the coating is less than one one-hundredth (1/100) the thickness of the bellows substrate. According to the exemplary embodiments, this very low thickness ratio between the coating and the bellows substrate enables the use of a ceramic in a flexible bellows, without cracking.

Figure 15A:
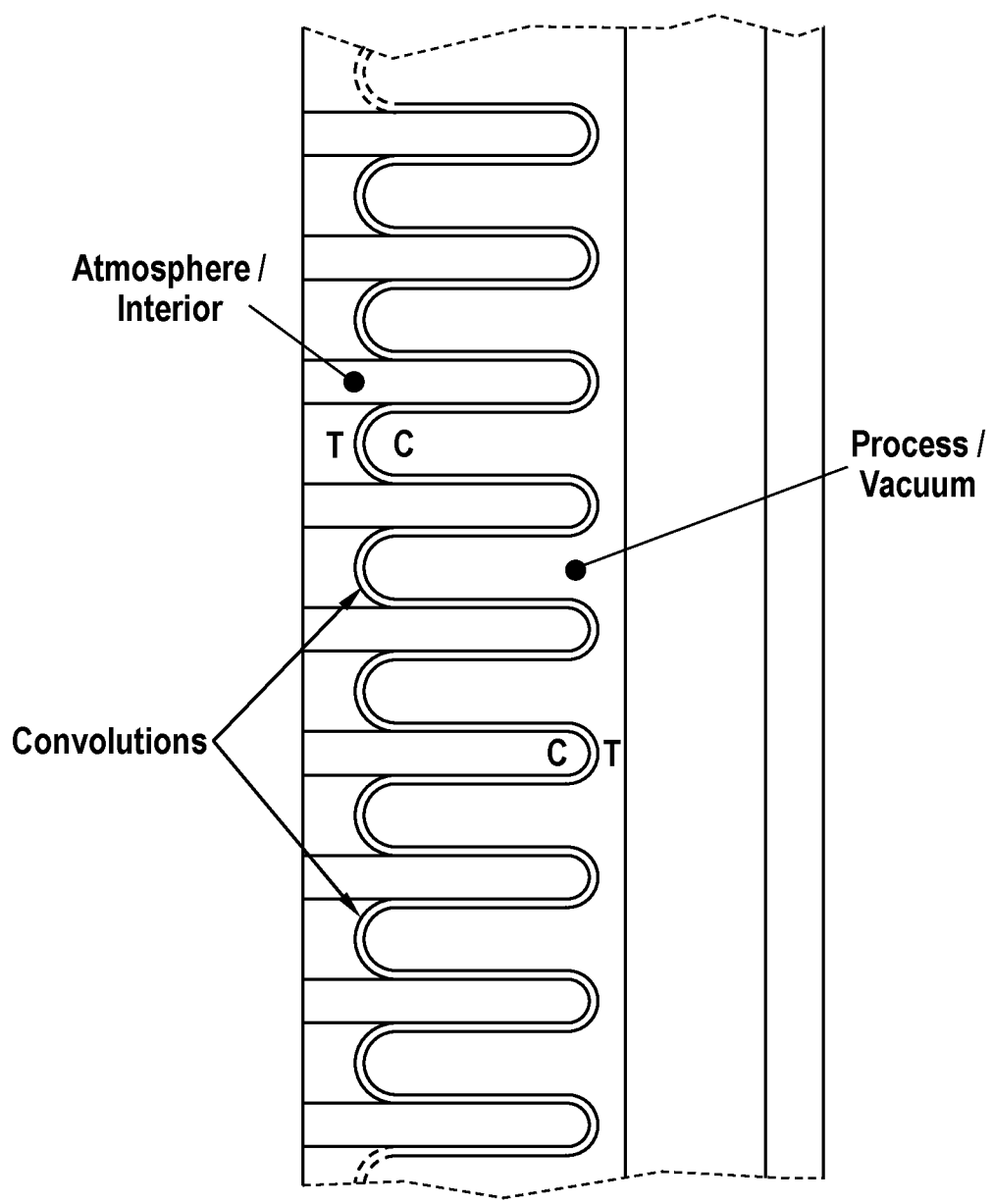
FIG. 15A includes a schematic cross-sectional view of formed valve bellows.
Figure 15B:
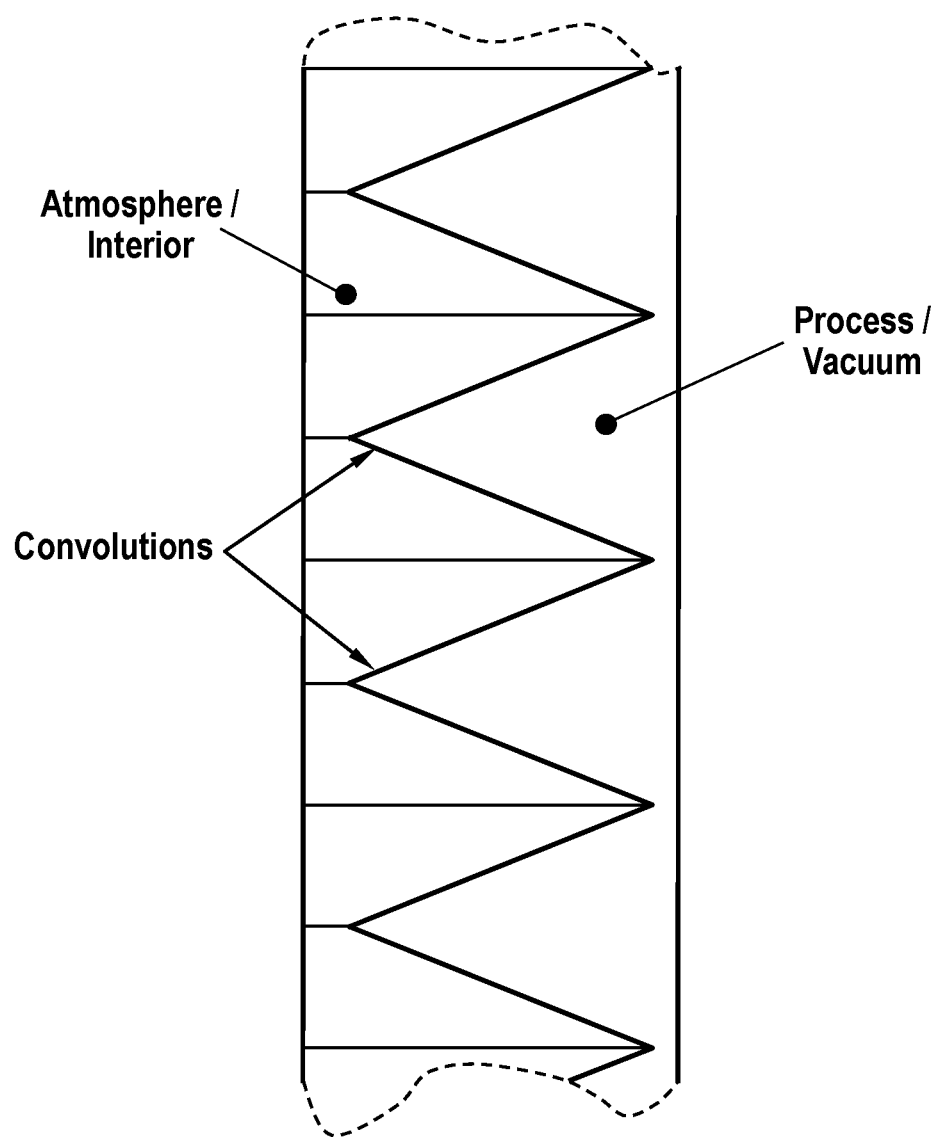
FIG. 15B includes a schematic cross-sectional view of welded valve bellows.

In general, there are two types of bellows, namely, formed bellows and welded bellows. FIG. 15A includes a schematic cross-sectional view of formed bellows. FIG. 15B includes a schematic cross-sectional view of welded bellows. Referring to FIGS. 15A and 15B, the left side of each bellows is the interior of the bellows at atmospheric pressure, and the right side of each bellows is the exterior or process side, under vacuum pressure levels. In the formed bellows, the regions labeled "T" are under tension during compression of the bellows, and the regions labelled 'C" are under compression during compression of the bellows.

Referring to FIG. 15B, In order to produce a robust coating for a welded bellows, according to some exemplary embodiments, it is important to ensure that the coating reaches the inner corners of the convolutions, and that the stress during actuation is compressive. In order to achieve this, in some exemplary embodiments, the atomic layer deposition (ALD) process used to apply the aluminum oxide coating is performed while the bellows is in a slightly elongated state. In some particular embodiments, this slightly elongated state is achieve by stretching the bellows to approximately its full longitudinal excursion and holding the bellows in that state while the ALD process is performed.

Referring again to FIG. 15A, as noted above, a formed bellows experiences both compression and tension on its outside surface during operation and excursions. In order to produce a more robust coating for a formed bellows, the stress state of the substrate can be varied in layers, such that the residual stress in each layer alternates between compression and tension. In this structure, a crack propagating through the surface may occur if a coating layer is in tension, but the crack will stop propagating when I reaches a surface where the coating is in compression. To achieve this coated bellows structure, the aluminum oxide coating is applied to the bellows substrate by ALD, in multiple layers, one layer at a time. According to the exemplary embodiments, each successive layer is applied with the bellows in alternate states of compression and elongation. That is, for example, the first layer is applied with the bellows compressed, the second layer is applied with the bellows elongated, the third layer is applied with the bellows compressed, etc., until the final layer is applied. In some particular exemplary embodiments, each layer has a thickness that is a predetermined fraction of the total desired coating thickness, in order to achieve the desired overall coating-to-substrate thickness ratio, e.g., less than 1/100. For example, if a total coating thickness of 0.5 μm is desired, a total of five layers, each having a thickness of 0.1 μm, can be applied to the bellows substrate.

Figure 16:
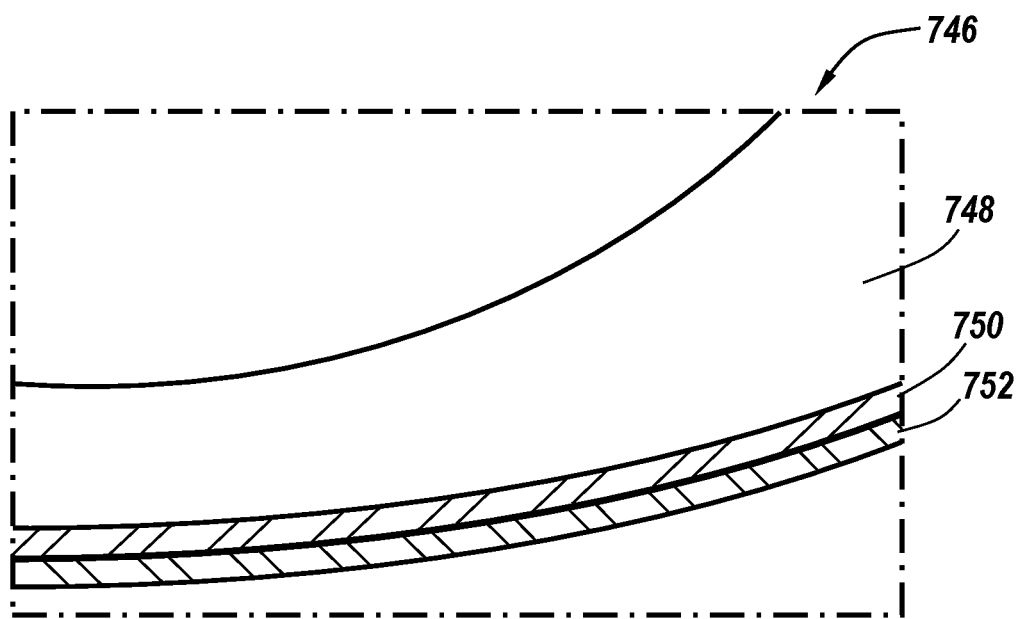
FIG. 16 includes a schematic detailed cross-sectional view of a portion of a formed bellows, in which a multilayer coating of aluminum oxide is formed on a bellows substrate, according to some exemplary embodiments.
Figure 17:
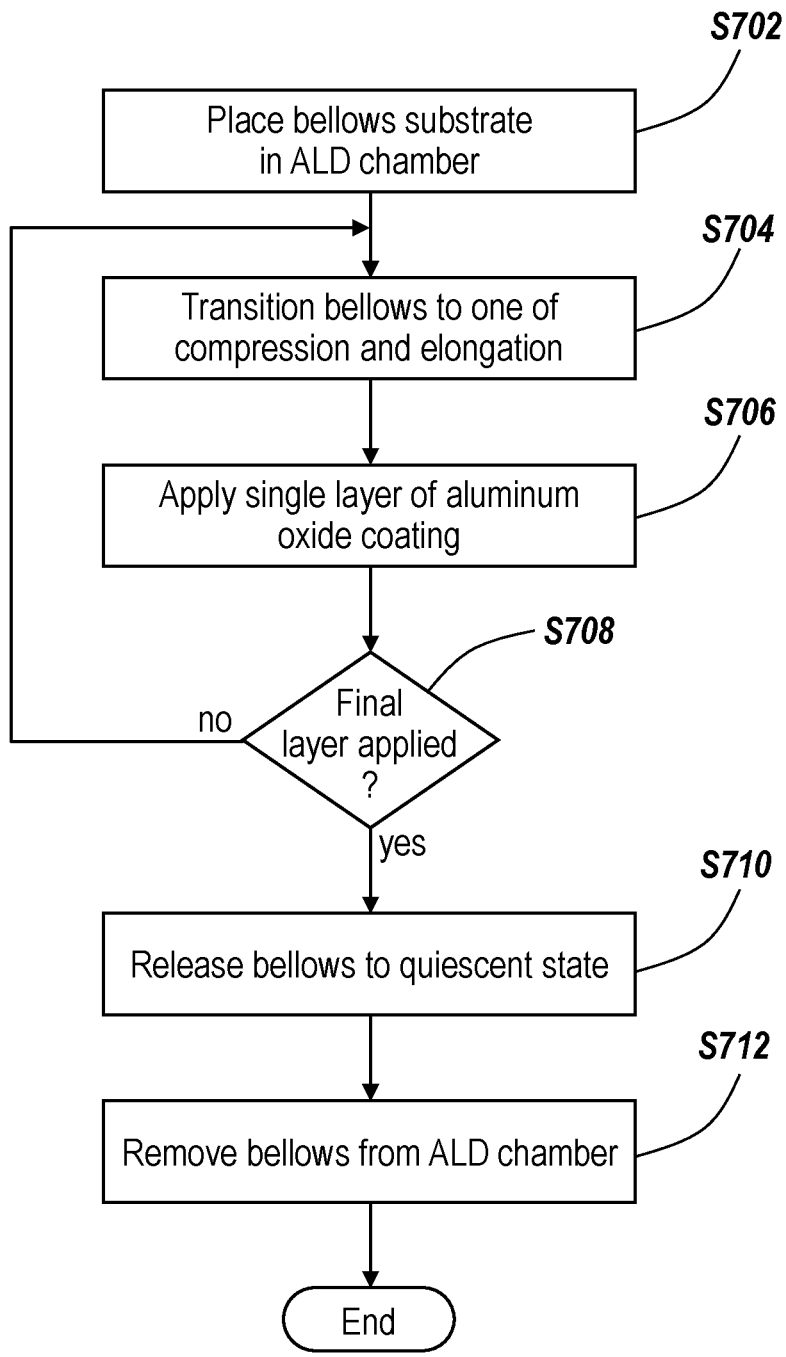
FIG. 17 includes a schematic logical flow diagram of the logical flow of a process of applying multilayer ceramic coating to a bellows substrate, according to some exemplary embodiments.

FIG. 16 includes a schematic detailed cross-sectional view of a portion of a formed bellows, in which a multilayer coating of aluminum oxide is formed on a bellows substrate, according to some exemplary embodiments. FIG. 17 includes a schematic logical flow diagram of the logical flow of a process of applying multilayer ceramic coating to a bellows substrate, according to some exemplary embodiments. Referring to FIGS. 16 and 17, bellows substrate 748 is placed in the ALD process chamber, as shown in step S702. Next, the bellows is transitioned to either the compression or elongation state, as shown in step S704. In some particular exemplary embodiments, the first ALD layer is formed with the bellows substrate in the compression state. Next, a single layer 750 of ceramic, i.e., aluminum oxide, coating is applied, as shown in step S706. In some exemplary embodiments, as noted above, each individual layer can be approximately 0.1 μm thick. It will be understood that other thicknesses can be used, and also that all layers need not have the same thickness. In step S708, a determination is made as to whether the final layer has been applied. If not, the process returns to step S704. The bellows is toggled (transitioned) to the other of the states, that is, if the bellows is compressed, it is transitioned to the elongated state, and, if it is elongated, it is transitioned to the compressed state. The next layer 752 of ceramic is applied in step S706, and the check is made again to determine whether all desired layers have been applied. As noted above, in some particular exemplary embodiments, this process continues until five layers have been applied. It will be understood that this process can be used to apply any number of layers. When all coating layers are complete, the bellows is released to its quiescent state, i.e., neither compressed nor elongated, in step S710, and the completed, coated bellows is removed from the ALD chamber in step S712.

It should be noted that, throughout the foregoing Detailed Description, the various valve embodiments are described as including active cooling. In the exemplary embodiments, this active cooling is achieved by effecting a flow of fluid through some portion of the valve, such as, for example, the movable closure device, i.e., nosepiece, flapper, gate, etc., and, in some exemplary embodiments, at least some portion of the valve body. In any of the embodiments described herein, the cooling fluid can be, for example, clean, dry compressed air, Nitrogen (N2) or other gas, with or without temperature control; water, or other liquid, with or without temperature control. Also, the fluid can be a heat transfer fluid, such as Galden® Heat Transfer Fluid, sold by Kurt J. Lesker Company, 1925 Route 51, Jefferson Hills, Pa. 15025 USA, or other such heat transfer fluid.

While the present inventive concept has been particularly shown and described with reference to exemplary embodiments thereof, it will be understood by those of ordinary skill in the art that various changes in form and details may be made therein without departing from the spirit and scope of the present inventive concept as defined by the following claims.

The invention claimed is:
1. A cooled isolation valve, comprising:
   a valve body;
   a stationary element coupled to the valve body and stationary with respect to the valve body;
   a movable closure element being movable with respect to the stationary element between a closed position in which the movable closure element and the stationary element are brought together and an open position, one of the movable closure element and the stationary element comprising a sealing element, in the closed position of the movable closure element, the sealing element providing a seal between the movable closure element and the stationary element;
   a fluid channel formed in contact with the movable closure element and movable with the movable closure element with respect to the stationary element, such that a fluid in the fluid channel effects heat transfer in the movable closure element;
   a temperature control system which controls temperature in the cooled isolation valve, the temperature control system including an actuator configured to modulate flow of the fluid fed into the fluid channel; and
   a sensor for detecting whether the movable closure element is in the open position or the closed position, wherein the actuator is configured to inhibit flow of the fluid when the sensor detects that the movable closure element is in the closed position.
2. The cooled isolation valve of claim 1, further comprising:
   a pneumatic actuation device for controlling movement of the movable closure element; and
   a bellows for isolating the pneumatic actuation device from an environment within the valve body, the bellows being disposed adjacent to the pneumatic actuation device radially from a longitudinal axis of the valve and at least partially overlapping the pneumatic actuation device along the longitudinal axis.
3. The cooled isolation valve of claim 1, wherein the sealing element comprises an 0-ring.
4. The cooled isolation valve of claim 3, further comprising:
   a groove in one of the stationary element and the movable closure element, the 0-ring being disposed in the groove, and a surface of the 0-ring protruding from the groove; and
   a protrusion in a surface of the other of the stationary element and the movable closure element, the protrusion contacting a portion of the protruding surface of the 0-ring when the movable closure element is in the closed position, such that the 0-ring is free to expand and contract.
5. The cooled isolation valve of claim 3, further comprising:
   a groove in one of the stationary element and the movable closure element, the 0-ring being disposed in the groove, and a surface of the 0-ring protruding from the groove; and
   a concave feature in a surface of the other of the stationary element and the movable closure element, the concave feature contacting a portion of the protruding surface of the 0-ring when the movable closure element is in the closed position, such that the 0-ring is free to expand and contract, the O-ring being deformed when the movable closure element is in the closed position.

6. The cooled isolation valve of claim 1, wherein the valve is a poppet valve.

7. The cooled isolation valve of claim 6, wherein the movable closure element comprises a nosepiece of the poppet valve.

8. The cooled isolation valve of claim 7, wherein the stationary element comprises a valve seat of the poppet valve.

9. The cooled isolation valve of claim 7, wherein at least a portion of the fluid channel is formed in the nosepiece.

10. The cooled isolation valve of claim 7, wherein the nosepiece is coupled to a movable stem of the cooled isolation valve.

11. The cooled isolation valve of claim 10, wherein at least a portion of the cooling channel is formed in the stem.

12. The cooled isolation valve of claim 6, wherein the sealing element comprises an 0-ring in a groove, the groove being formed in a nosepiece of the poppet valve.

13. The cooled isolation valve of claim 1, wherein:
the valve is a gate valve; and
the movable closure element comprises a gate movable between the closed position and the open position and a shaft fixedly attached to the gate, rotation of the shaft causing movement of the gate between the open and closed positions.

14. The cooled isolation valve of claim 13, wherein the stationary element comprises a valve seat.

15. The cooled isolation valve of claim 13, wherein at least a portion of the cooling channel is formed in the gate.

16. The cooled isolation valve of claim 13, wherein at least a portion of the cooling channel is formed in the shaft.

17. The cooled isolation valve of claim 13, wherein the sealing element comprises an 0-ring in a groove, the groove being formed in the gate.

18. The cooled isolation valve of claim 1, wherein:
the valve is a butterfly valve; and
the movable closure element comprises a flapper movable between the closed position and the open position and a shaft fixedly attached to the flapper, rotation of the shaft causing movement of the flapper between the open and closed positions.

19. The cooled isolation valve of claim 18, wherein the stationary element comprises walls of an opening through the valve.

20. The cooled isolation valve of claim 18, wherein at least a portion of the cooling channel is formed in the flapper.

21. The cooled isolation valve of claim 18, wherein at least a portion of the cooling channel is formed in the shaft.

22. The cooled isolation valve of claim 1, wherein the fluid comprises a gas.

23. The cooled isolation valve of claim 1, wherein the fluid comprises a liquid.

24. The cooled isolation valve of claim 1, wherein the fluid comprises air.

25. The cooled isolation valve of claim 1, wherein the fluid comprises nitrogen (N2).

26. The cooled isolation valve of claim 1, wherein the fluid comprises water.

27. The cooled isolation valve of claim 1, wherein the fluid comprises a heat transfer fluid.

28. The cooled isolation valve of claim 1, wherein the actuator comprises a pilot valve.

29. The cooled isolation valve of claim 28, wherein the temperature control system further includes a temperature sensor for sensing temperature in the cooled isolation valve.

30. The cooled isolation valve of claim 28, wherein the temperature control system is configured to be active when temperature in the cooled isolation valve reaches a predetermined temperature set point.

31. The cooled isolation valve of claim 1, wherein the temperature control system is configured to be active when temperature in the cooled isolation valve reaches a predetermined temperature set point.

32. The cooled isolation valve of claim 1, wherein the temperature control system further includes a temperature sensor for sensing temperature in the cooled isolation valve.

33. The cooled isolation valve of claim 32, wherein the temperature control system is configured to be active when temperature in the cooled isolation valve reaches a predetermined temperature set point.

34. The cooled isolation valve of claim 32, wherein the temperature sensor comprises a thermocouple.

35. The cooled isolation valve of claim 34, wherein the temperature control system is configured to be active when temperature in the cooled isolation valve reaches a predetermined temperature set point.

* * * * *